(12) United States Patent
Lentz

(10) Patent No.: US 11,966,138 B2
(45) Date of Patent: Apr. 23, 2024

(54) METHODS OF MODULATING LIGHT USING LIQUID CRYSTAL POLARIZATION GRATINGS

(71) Applicant: Government of the United States as represented by the Secretary of the Air Force, Wright-Patterson AFB, OH (US)

(72) Inventor: Joshua Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/569,247

(22) Filed: Jan. 5, 2022

(65) Prior Publication Data

US 2022/0128845 A1   Apr. 28, 2022

Related U.S. Application Data

(63) Continuation of application No. 15/689,022, filed on Aug. 29, 2017, now abandoned.
(Continued)

(51) Int. Cl.
*G02F 1/139*   (2006.01)
*G02B 5/00*   (2006.01)
(Continued)

(52) U.S. Cl.
CPC ............... *G02F 1/139* (2013.01); *G02B 5/18* (2013.01); *G02F 1/1313* (2013.01); *G02F 1/13363* (2013.01); *G02F 1/133711* (2013.01); *G02F 1/133788* (2013.01); *G02F 1/13439* (2013.01); *G02F 1/13471* (2013.01); *G02F 1/29* (2013.01); *G02F 1/292* (2013.01); *H04N 9/3164* (2013.01);
(Continued)

(58) Field of Classification Search
CPC ........................... G02F 1/139; G02F 1/13439
See application file for complete search history.

(56) References Cited

U.S. PATENT DOCUMENTS

| 2008/0186509 | A1* | 8/2008 | Kato ................. G01M 11/0264 356/521 |
| 2009/0244471 | A1* | 10/2009 | Kondo ................. G02F 1/1303 349/158 |

(Continued)

*Primary Examiner* — Lauren Nguyen
(74) *Attorney, Agent, or Firm* — AFMCLO/JAZ; Chastity D. S. Whitaker

(57) ABSTRACT

A projector includes a beam homogenizer receiving light from a light source and creating a predetermined illumination, and a spatial light modulator including grating stages to receive the predetermined illumination. Each grating stage may include a plurality of pixels where corresponding pixels in the grating stages are aligned with one another. Each of the pixels may include a liquid crystal layer disposed between two substrates, where a pixel is switchable by applying a voltage thereto, with a grating period of the pixel selected such that, when the voltage is applied to the pixel and light is passed therethrough, optical energy from the light in plus and minus first orders is deflected toward sides of the pixel and optical energy from a zero order of the light is allowed to pass through the pixel, with a polarization state of the light maintained through the pixel.

14 Claims, 18 Drawing Sheets

Related U.S. Application Data

(60) Provisional application No. 62/509,996, filed on May 23, 2017.

(51) Int. Cl.
| | |
|---|---|
| *G02B 5/18* | (2006.01) |
| *G02B 27/42* | (2006.01) |
| *G02F 1/13* | (2006.01) |
| *G02F 1/13363* | (2006.01) |
| *G02F 1/1337* | (2006.01) |
| *G02F 1/1343* | (2006.01) |
| *G02F 1/1347* | (2006.01) |
| *G02F 1/29* | (2006.01) |
| *H04N 9/31* | (2006.01) |

(52) U.S. Cl.
CPC ........... *H04N 9/3167* (2013.01); *G02B 5/003* (2013.01); *G02B 27/4233* (2013.01); *G02F 1/133631* (2021.01); *G02F 1/133757* (2021.01); *G02F 2203/04* (2013.01); *G02F 2203/07* (2013.01); *G02F 2203/22* (2013.01); *G02F 2203/24* (2013.01); *G02F 2203/48* (2013.01)

(56) References Cited

U.S. PATENT DOCUMENTS

| | | | | |
|---|---|---|---|---|
| 2011/0242461 A1* | 10/2011 | Escuti | ................... | H04N 9/3167 349/96 |
| 2012/0188467 A1* | 7/2012 | Escuti | ................... | G02F 1/1347 349/1 |

* cited by examiner

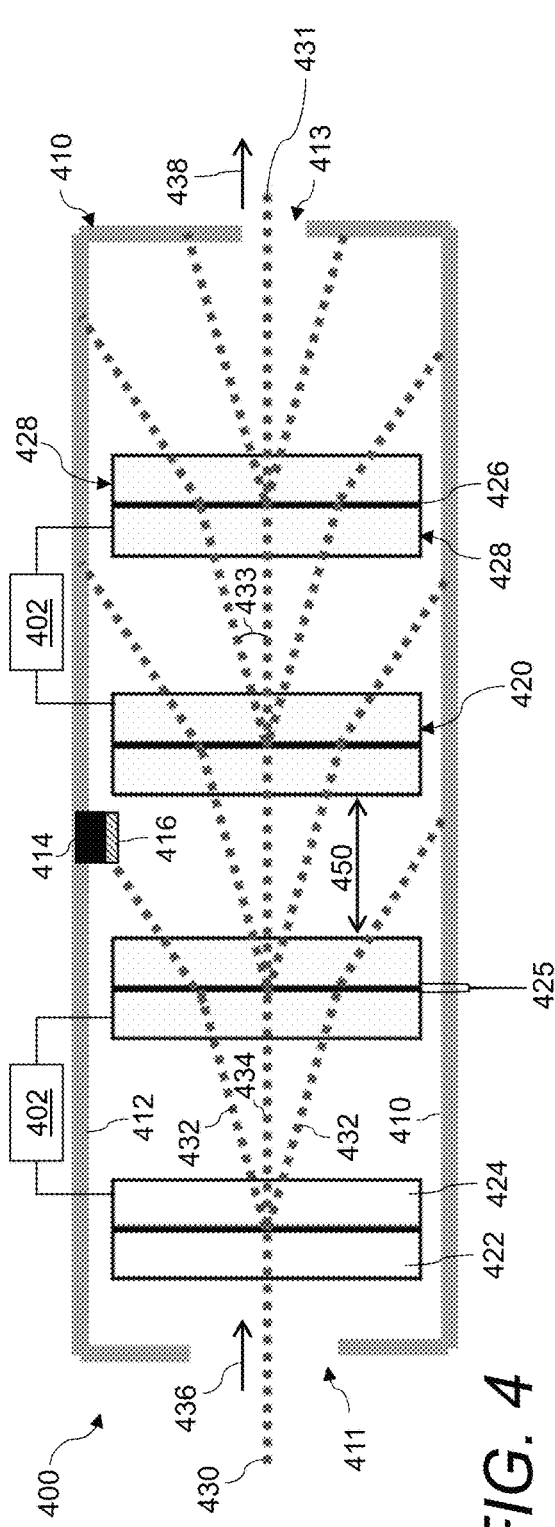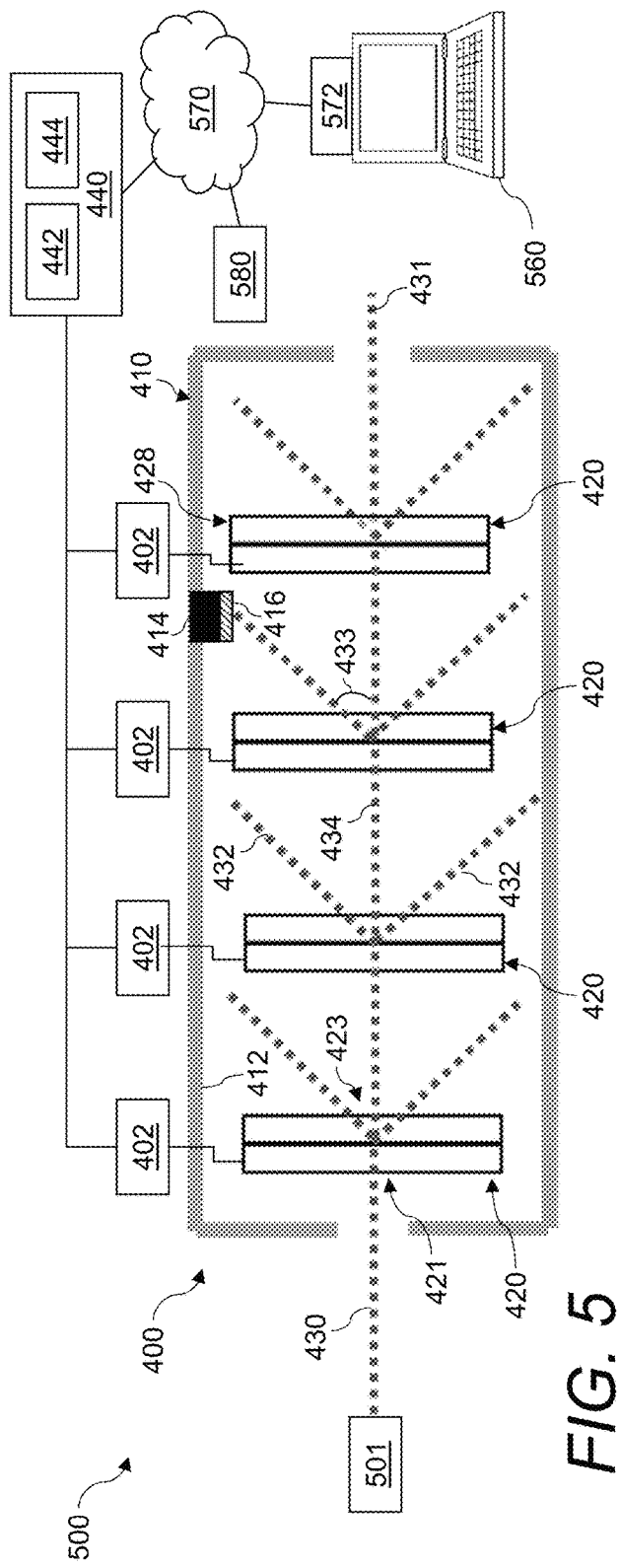
FIG. 4
FIG. 5

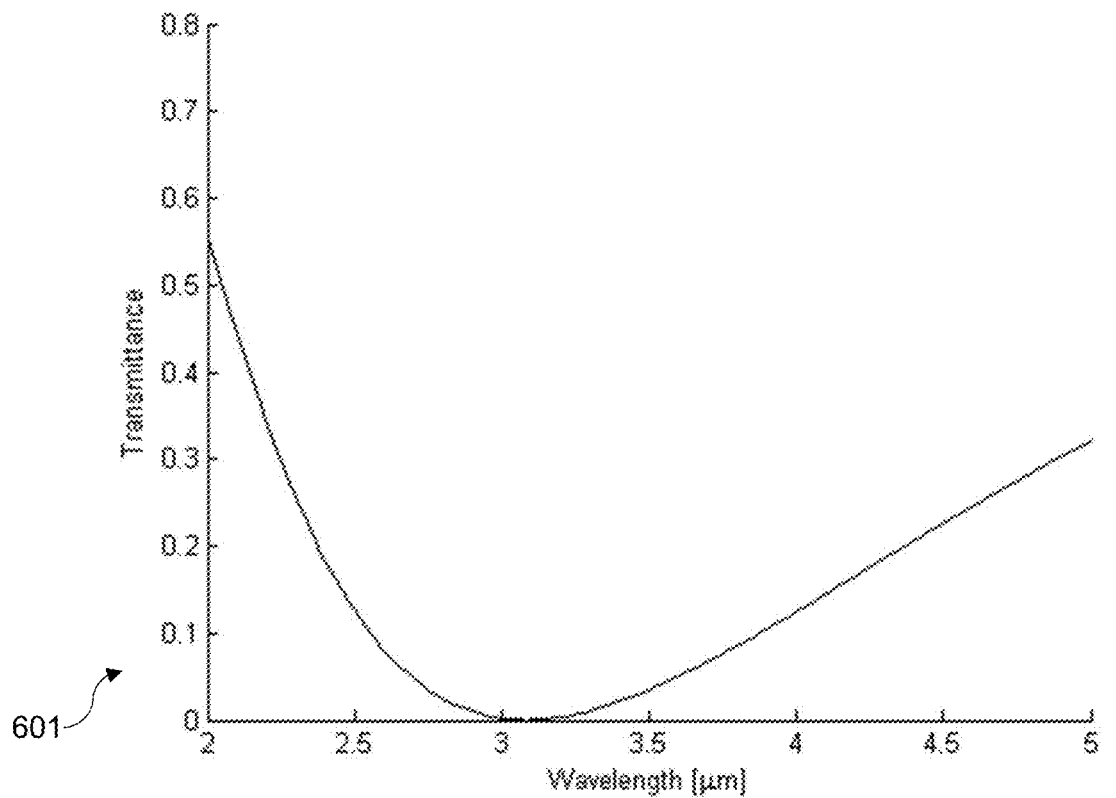
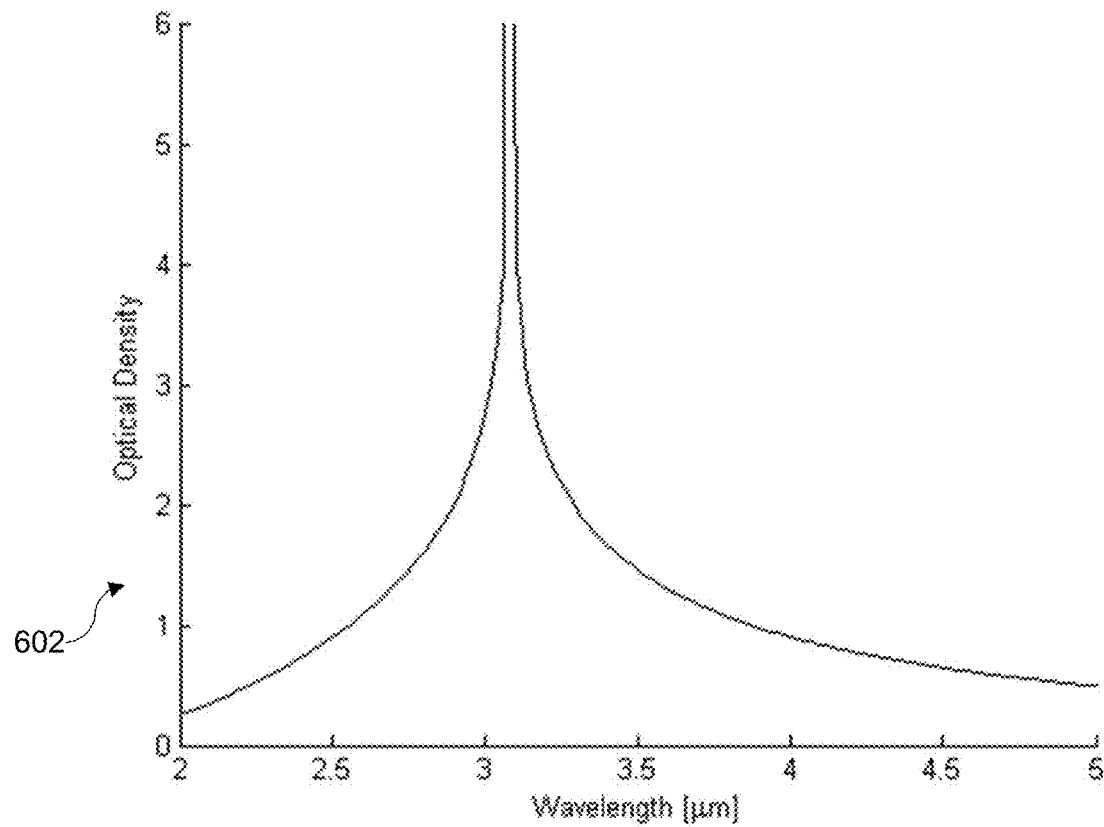
FIG. 6

METHODS OF MODULATING LIGHT USING LIQUID CRYSTAL POLARIZATION GRATINGS

CROSS-REFERENCE TO RELATED APPLICATIONS

This application is a continuation of U.S. application Ser. No. 15/689,022 filed on Aug. 29, 2017, which claimed the benefit of and priority to U.S. Provisional Application Ser. No. 62/509,996, entitled "Compact, High Speed, Achromatic Mid-wave Infrared Attenuator," filed on May 23, 2017. The disclosure of these applications is incorporated by reference, each in its entirety.

This application is also related to U.S. patent application Ser. No. 15/688,981, now U.S. Pat. No. 10,761,391, which was also filed on Aug. 29, 2017 and was entitled "Optical Attenuator." The disclosure of this patent is incorporated herein by reference in its entirety.

STATEMENT OF GOVERNMENT INTEREST

The invention described herein may be manufactured and used by or for the Government of the United States for all governmental purposes without the payment of any royalty.

BACKGROUND

Scene generating systems are used for a variety of applications. For example, commonly, they are used in displays such as televisions, computer monitors, mobile computing devices such as tablets and cell phones, along with other consumer electronics such as fitness "watches," GPS displays, fish finders, and so on. Other applications include test capabilities such as scene projector systems in which scenes are presented to sensor devices under development. In some cases, scene projectors can be used to create simulation environments for human subject testing, as well as for insect or other biological specimen tests.

A particularly challenging application may include scene generation in the infrared when high resolution imagery is desired. There are several approaches used to meet this need such as arrays of micro-resistors, arrays of infrared (IR) light-emitting diodes (LEDs), and Liquid Crystal on Silicon (LCoS). Resistor arrays may be limited in their operation frequency since heating and cooling through applied electrical current is a slow process. Resistor arrays may also be limited in the apparent temperature that they can produce before heat cannot be dissipated quickly enough and the device fails catastrophically. IR LEDs, though promising, are generally in developmental stages and may be costly to produce. LCoS devices, although viable options, are also costly and may not allow for broadband operation. Thus, there remains a need for improved devices, systems, and methods for scene generation/projection.

A solution (e.g., a simple and relatively low-cost solution) to infrared scene generation may include a system whose spatial light modulation is accomplished through arrays of cycloidal diffractive waveplates (CDWs), also known as liquid crystal polarization gratings (LCPGs). Through use of a series of specifically selected CDW arrays and appropriate control thereof, a broadband achromatic spatial light modulator can be created with very fine resolution that is capable of high speed operation relative to prior art solutions. This system may be capable of attaining relatively high apparent temperatures through appropriate selection of illumination source(s), while also being capable of superior operating speeds relative to resistor arrays, and dissipating relatively large amounts of heat. For example, such spatial light modulators may be much cheaper (about 5%-20%) to fabricate relative to IR LEDs, and may have a much broader operating spectrum than LCoS devices (with a sizable improvement in cost over LCoS as well). Also, though the advantages of using CDW arrays for spatial light modulation may be most obvious in the infrared, the concept may be valid for ultraviolet, visible, near-infrared, and all infrared spectra.

SUMMARY

A projector may include a beam homogenizer structurally configured to receive light from a light source and to create from the received light a predetermined illumination, and a spatial light modulator including a number of grating stages configured to receive the predetermined illumination. Each grating stage in the number of grating stages may include a plurality of pixels where corresponding pixels in each of the number of grating stages are aligned with one another, and where each of the plurality of pixels includes a liquid crystal layer disposed between two substrates, where one or more of the two substrates is coated with a photo-alignment layer adjacent to the liquid crystal layer and coated with transparent electrodes. At least a pixel in the plurality of pixels may be switchable by applying a voltage thereto, with a grating period of the pixel selected such that, when the voltage is applied to the pixel and light is passed therethrough, optical energy from the light in plus and minus first orders is deflected toward sides of the pixel and optical energy from a zero order of the light is allowed to pass through the pixel, with a polarization state of the light maintained from an input of the light entering the pixel through an output of the light exiting the pixel. The projector may also include an aperture structurally configured to block light in the plus and minus first orders that is deflected by the pixel.

In an implementation, a method may include receiving light from a light source, creating a predetermined illumination from the light, and receiving the predetermined illumination at a spatial light modulator including a number of grating stages, where each grating stage in the number of grating stages includes a plurality of pixels where corresponding pixels in each of the number of grating stages are aligned with one another, where each of the plurality of pixels includes a liquid crystal layer disposed between two substrates, and where one or more of the two substrates is coated with a photo-alignment layer adjacent to the liquid crystal layer and coated with transparent electrodes. The method may also include deflecting, in response to an electrical bias applied to a pixel, optical energy from the light in plus and minus first orders, and allowing a zero order of the light to pass through the pixel. The method may also include blocking light in the plus and minus first orders that is deflected by the pixel.

In an implementation, a method may include placing a liquid crystal layer between two substrates to create a grating stage included in a plurality of grating stages of a spatial light modulator, coating one or more of the two substrates with a photo-alignment layer adjacent to the liquid crystal layer and with transparent electrodes, dividing the grating stage into a plurality of pixels, and electrically coupling one or more pixels of the plurality of pixels to be independently switchable by applying a voltage thereto, with a grating period of the one or more pixels selected such that, when the voltage is applied to a pixel and light is passed therethrough, optical energy from the light in plus and minus first orders is deflected toward sides of the pixel and optical energy from a zero order of the light is allowed to pass through the pixel, with a polarization state of the light maintained from an input of the light entering the pixel through an output of the light exiting the pixel.

In an implementation, a device may include one or more grating stages each including a plurality of pixels, where corresponding pixels in each of the one or more grating stages are aligned with one another, and where each of the plurality of pixels includes a liquid crystal layer disposed between two substrates, where one or more of the two substrates is coated with a photo-alignment layer adjacent to the liquid crystal layer and coated with transparent electrodes. At least a pixel in the plurality of pixels may be switchable by applying a voltage thereto, with a grating period of the pixel selected such that, when the voltage is applied to the pixel and light is passed therethrough, optical energy from the light in plus and minus first orders is deflected toward sides of the pixel and optical energy from a zero order of the light is allowed to pass through the pixel, with a polarization state of the light maintained from an input of the light entering the pixel through an output of the light exiting the pixel.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 4 illustrates an attenuator with diffracted light passing through multiple gratings, in accordance with a representative embodiment.

FIG. 5 illustrates an attenuator with light diffracted to a housing, in accordance with a representative embodiment.

FIG. 6 illustrates the average minimum transmittance of a single grating stage, in accordance with a representative embodiment.

DETAILED DESCRIPTION

Figure 1:
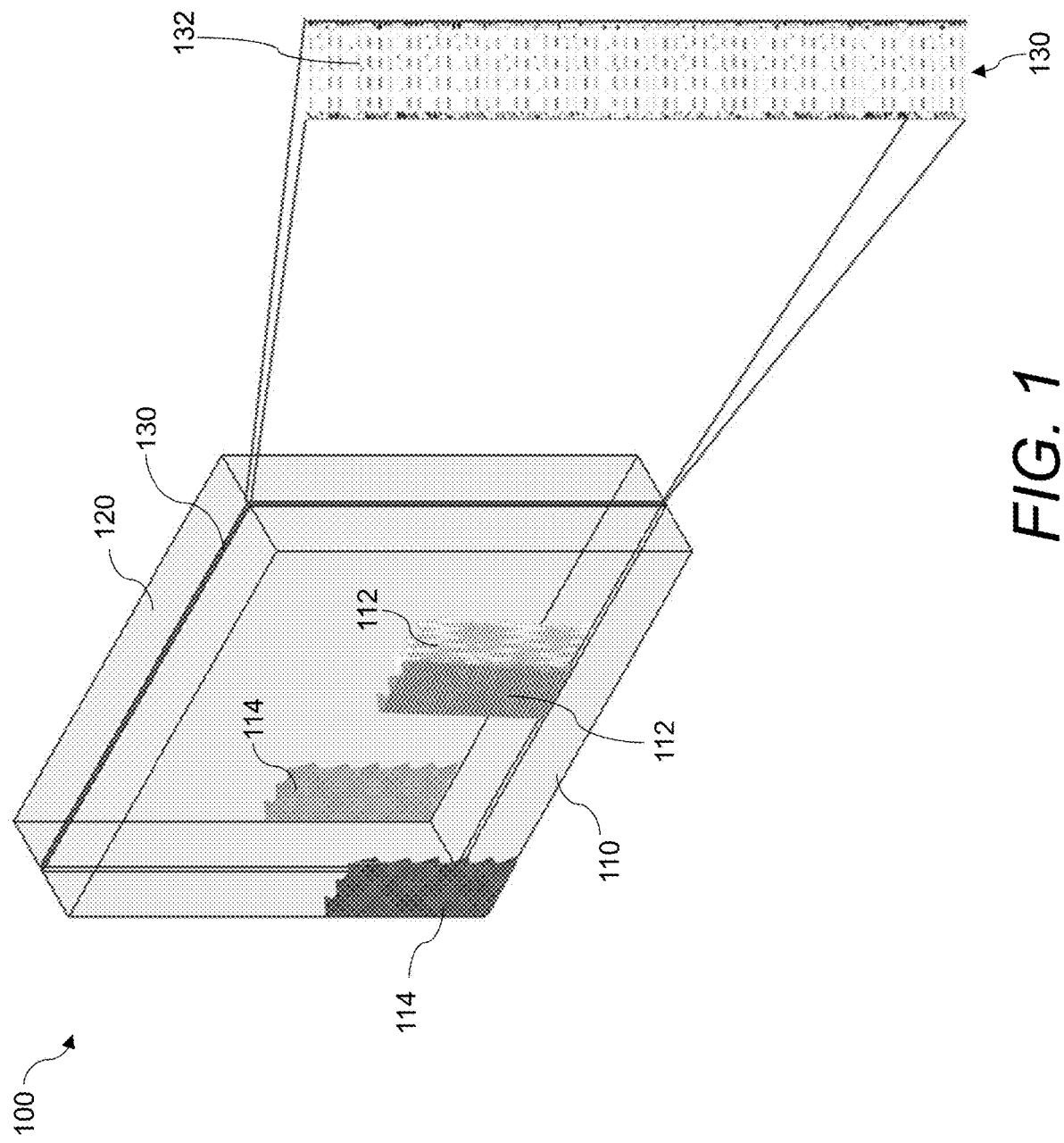
FIG. 1 illustrates a liquid crystal polarization grating of an attenuator, in accordance with a representative embodiment.

The various methods, systems, apparatuses, and devices described herein generally provide for projection using liquid crystal polarization gratings to modulate light.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, the term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. For simplicity and clarity of illustration, reference numerals may be repeated among the figures to indicate corresponding or analogous elements.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Part I—Optical Attenuation

In general, the devices, systems, and methods described herein may be configured for, and may include, optical attenuation. More specifically, the present disclosure includes devices, systems, and methods for broadband attenuation. As used herein, "broadband" may include a spectral bandwidth on the order of about 1.5 times the center wavelength. Broadband attenuation may be used in a wide range of free-space applications that include multi-line or supercontinuum laser sources. In some situations, source fidelity is desired to be maintained, including polarization states, relative spectral content, and continuous wave operation. In such cases, broadband attenuation as described herein may be used, e.g., where parameters for the attenuator are beyond the limits of conventional systems. To this end, described herein are switchable cycloidal diffractive waveplates (CDWs), achromatized for broadband operation as a laser attenuator—e.g., an achromatic mid-wave infrared attenuator. It will be understood that, unless explicitly stated to the contrary or otherwise clear from the context, a CDW may also be referred to herein as a liquid crystal polarization grating (or LCPG), a grating, and a grating stage.

An attenuator as described herein (e.g., an achromatic mid-wave infrared attenuator) may include one or more grating stages comprising liquid crystal polarization gratings. Such a liquid crystal polarization grating is described below, e.g., with reference to FIG. 1.

In general, liquid crystal polarization gratings can be included in relatively high-efficiency grating devices having negligible polarization sensitivity. Liquid crystal polarization gratings may be able to produce a spatially unchanged zero-order beam that preserves the polarization characteristics of input light. With appropriate electronic switching of the liquid crystal, varying amounts of the input light may be directed into the +1 and −1 diffracted orders, reducing the energy transmitted in the 0-order path. If this concept was extended into the mid-wave infrared (MWIR) spectral region, it may overcome the polarization sensitivity and multiple reflection problems associated with CVNDs as described above. Size, weight, and power requirements may also be significantly improved through the use of liquid crystal polarization gratings. Specifically, through an appropriate combination of liquid crystal polarization gratings in a system, the spectral dependence of attenuation may be reduced considerably.

FIG. 1 illustrates a liquid crystal polarization grating of an attenuator, in accordance with a representative embodiment. In particular, FIG. 1 illustrates the physical components of a single transmissive liquid crystal polarization grating 100 (CDW), including a layer of liquid crystal between two substrates with a photo-alignment coating on one side and transparent conductive electrodes on the opposite side of each substrate. The liquid crystal polarization grating 100 may be used in a variety of applications including without limitation displays, imaging applications, modulators, and attenuators such as those described herein. The liquid crystal polarization grating 100 may utilize sinusoidal grating patterns rather than binary grating patterns, thereby reducing the complexity of diffracted orders and polarization states. For example, the output of the liquid crystal polarization grating 100 may include, at most, the plus and minus first orders and the zero order of the input, where the zero order maintains the same polarization state as the input, which may be highly desirable in certain applications. In general, the liquid crystal polarization grating 100 may achieve switchable attenuation, achieve broadband performance, and achieve relatively fast switching times (e.g., for high frequency operation).

The liquid crystal polarization grating 100 may include a first substrate 110, a second substrate 120, and a liquid crystal layer 130 disposed therebetween.

The first substrate 110 and the second substrate 120 may be the same, e.g., they may be made from the same materials, they may have the same dimensions (e.g., thicknesses, shape, and size), they may have the same coatings, and so on. In other implementations, the first substrate 110 and the second substrate 120 are different, e.g., having one or more of different materials, different dimensions, different coatings, and so on. In certain implementations, the first substrate 110 and the second substrate 120 are glass plates. The first substrate 110 and the second substrate 120 may also or instead be made of other materials such as a polymer, silicon, or the like. Embodiments may further include more than two substrates, or a liquid crystal layer 130 formed within a single substrate.

One or more of the first substrate 110 and the second substrate 120 may be coated with one or more of a photo-alignment layer 112 and transparent electrodes 114. In an implementation, each of the substrates are coated with the photo-alignment layer 112 and transparent electrodes 114. For example, the photo-alignment layer 112 may be disposed on an inside surface of each of the first substrate 110 and the second substrate 120 (where the inside surface is the surface abutting the liquid crystal layer 130), and the transparent electrodes 114 may be disposed on an outside surface (opposite the inside surface) of each of the first substrate 110 and the second substrate 120.

The photo-alignment layer 112 may include any material with properties for photo-alignment as known in the art. In general, the photo-alignment layer 112 may be disposed adjacent to the liquid crystal layer 130. In this manner, the photo-alignment layer 112 may be in physical contact with the liquid crystal layer 130. The photo-alignment layer 112 may be cured in a cycloidal pattern to anchor the liquid crystal layer 130 thereby creating a base for a sinusoidal pattern. It will be understood that one or more of the substrates may also or instead include photo-alignment properties (e.g., from a material property of the substrate), e.g., in addition to, or instead of, being coated with a photo-alignment layer 112. Thus, in this manner, the photo-alignment properties of one or more of the first substrate 110 and the second substrate 120 may be provided by coating one or more of the first substrate 110 and the second substrate 120 with a photo-alignment layer 112, or the photo-alignment properties may be inherent in the material or otherwise provided. Similarly, one or more of the first substrate 110 and the second substrate 120 may include transparent electrodes 114, which may be coated on the substrates or provided by other means.

The transparent electrodes 114 may be located on the outside of the substrates, within the substrates, or on the inside of the substrates. The transparent electrodes 114 may be selected to operate in a predetermined spectrum. The predetermined spectrum may include a visible spectrum into a short-wave infrared spectrum. To this end, the transparent electrodes 114 may include indium tin oxide (ITO). The predetermined spectrum may instead include a mid-wave infrared spectrum, e.g., a 2.0 µm-5.0 µm spectrum, or a long-wave infrared spectrum. To this end, the transparent electrodes 114 may include one or more of carbon nanotubes, graphene, and gallium arsenide. Thus, in general, the transparent electrodes 114 may be used to control the liquid crystal polarization grating 100, where the transparent electrodes 114 are capable of operating in the spectrum of interest. It will be understood that one or more of the substrates may also or instead be conductive or otherwise capable of receiving an applied voltage, e.g., in addition to or instead of being coated with transparent electrodes 114.

Liquid crystals 132 in the liquid crystal layer 130 may provide the switchable performance of the liquid crystal polarization grating 100. Thus, in certain implementations, a liquid crystal polarization grating 100 may include a liquid crystal material (e.g., the liquid crystal layer 130) disposed between two glass plates (e.g., the substrates). Each glass plate may be coated on one side with a transparent electrode material such as ITO or graphene, where the other side is coated with a photo-alignment layer 112. For both glass plates, the photo-alignment layers 112 may be in contact with the liquid crystal compound (e.g., the liquid crystal layer 130). The photo-alignment layers 112 may be cured by interfering lasers, which anchor the liquid crystals 132 at the photo-alignment layer 112, thereby creating the base for a sinusoidal (phase) pattern.

In use, as voltage is applied across the liquid crystal polarization grating 100, the liquid crystal molecules may be re-oriented, changing the local retardation of the anisotropic liquid crystals 132 (and/or changing the refractive index) such that a sinusoidally varying spatial pattern of retardation of the refractive index occurs. The local polarization of the incident light may be affected by the retardation introduced by the anisotropic nature of the liquid crystals 132. Any uniform illumination may result in emerging light with sinusoidally varying (spatially) polarization characteristics, creating a polarization grating phenomenon. Performance of the liquid crystal polarization grating 100, and thus performance of an attenuator including such a liquid crystal polarization grating 100, may be related to the local retardation. Physical processes and an explanation of the name "cycloidal diffractive waveplates" (CDW) is described, e.g., in S. R. Nersisyan et al., "The principles of laser beam control with polarization gratings introduced as diffractive waveplates," Proc. SPIE 7775, Liquid Crystals XIV, 77750U (Aug. 17, 2010), which is incorporated by reference in its entirety.

For a liquid crystal polarization grating 100 with a liquid crystal cell thickness of d, a birefringence of Δn, and operating at a wavelength λ, the grating efficiency η is governed by:

$$\eta(\lambda) = \cos^2\left(\frac{\pi \Delta n d}{\lambda}\right) \quad \text{Eq. 1}$$

Though not explicitly stated in Eq. 1, the birefringence may be a function of applied voltage. In other words, as the applied voltage changes, the retardation changes as a result of the reorientation of the liquid crystals 132. The results of applied voltage will now be discussed with reference to the examples illustrated in FIGS. 2 and 3.

As described in more detail throughout this disclosure, the thickness of the liquid crystal cell or liquid crystal layer 130 in a liquid crystal polarization grating 100 may be selected, controlled, or manipulated to perform different functions, e.g., to achieve different attenuation characteristics for light passing through the liquid crystal polarization grating 100 or a series of liquid crystal polarization gratings 100. For example, the present teachings describe how the thickness of the liquid crystal layer 130 may be selectively used in an attenuator or an attenuator system featuring a plurality of liquid crystal polarization gratings 100. The principles of the effects of the thickness of the liquid crystal layer 130 are briefly described below.

As shown in Eq. 1 above, the product of the index of refraction n and thickness of an element (in the present teachings, the thickness of the liquid crystal, d) is the optical path length, which is directly related to the amount of phase change the light experiences in passing through the liquid crystal polarization grating 100. When the index is anisotropic (as in the case of the liquid crystals in the present teachings), there is a different phase change for the two perpendicular polarizations states (this comes from a difference of refractive indices, called birefringence). The difference in phase is the amount of retardation that is experienced by the light—this is the concept of a waveplate. In a CDW application, unlike a standard waveplate, the amount of retardation may not be uniform, but it has an associated sinusoidal (cycloidal) pattern. If the thickness of the liquid crystal cell is changed, the amount of retardation may be changed, which, for a given birefringence (e.g., equivalent in the present teachings to a given control voltage) and wavelength, changes how much energy is transferred to each diffracted order. Thus, the liquid crystal cell thickness can be treated as a parameter in defining how much energy is transmitted through a grating at a given voltage.

Figure 2:
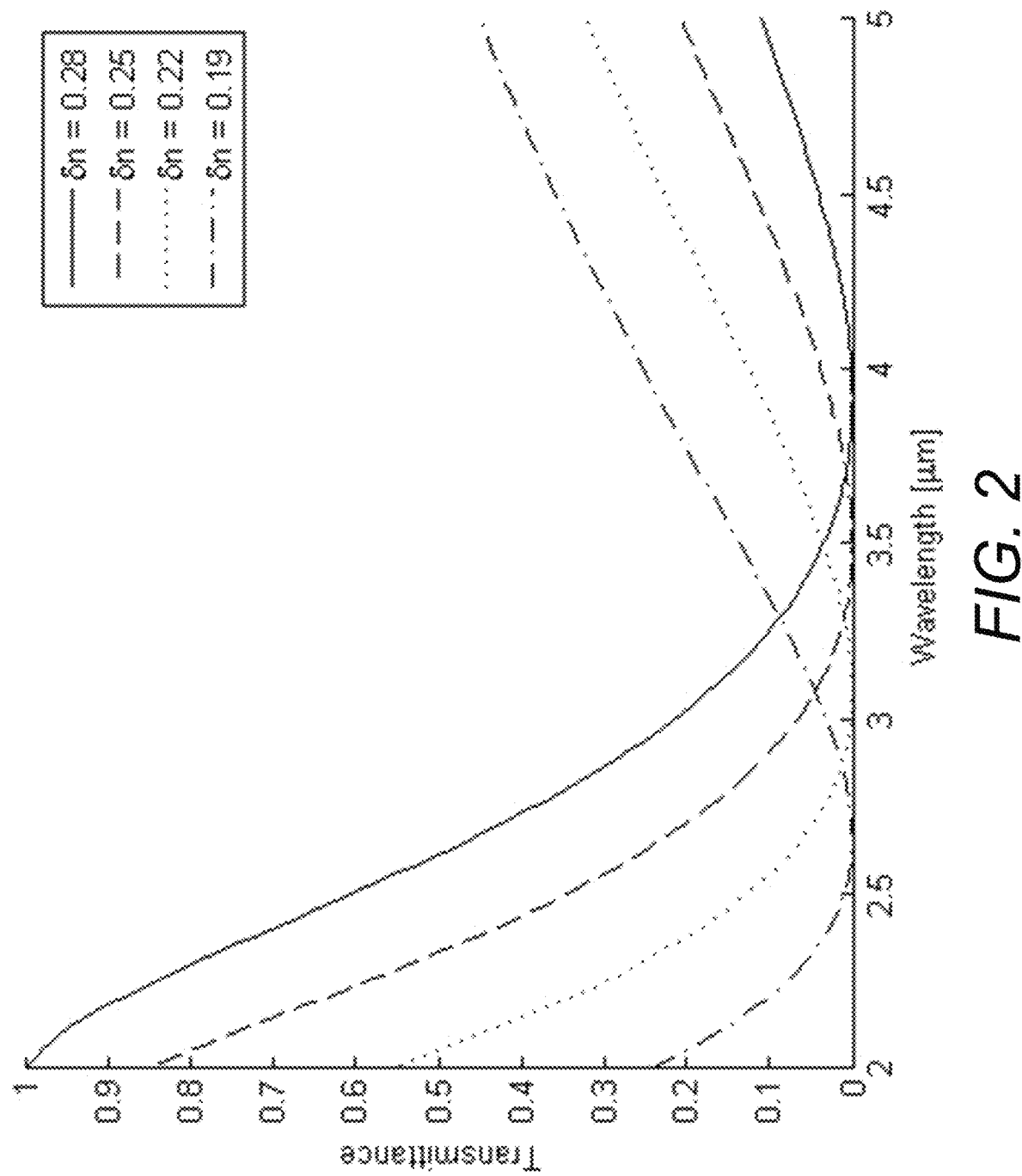
FIG. 2 illustrates a graph showing the zero-order transmission of a liquid crystal polarization grating as a change of birefringence induced by an applied voltage, in accordance with a representative embodiment.
Figure 3:
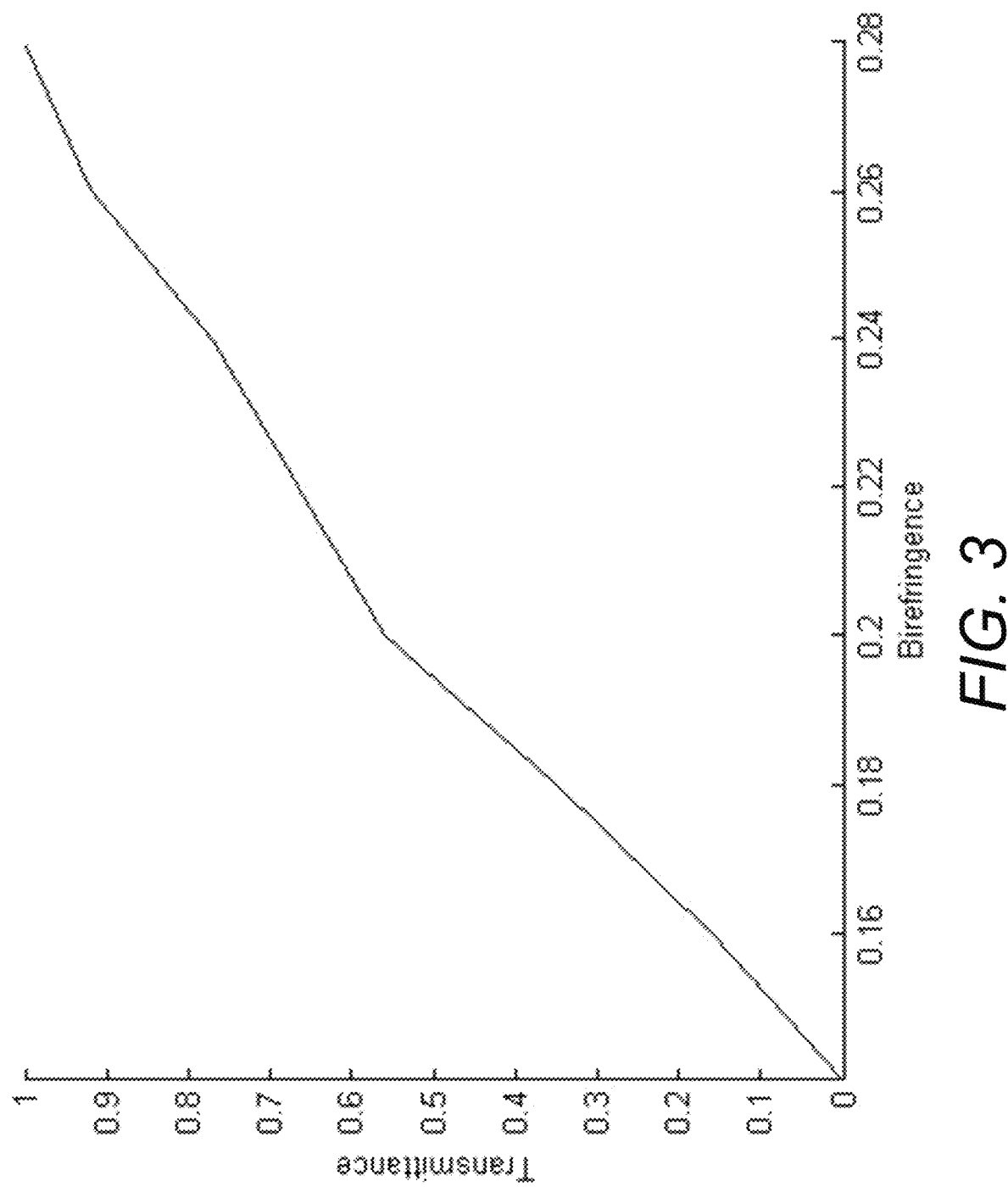
FIG. 3 illustrates the transmission data extracted from FIG. 2 at a wavelength of 2.0 µm, in accordance with a representative embodiment.

FIG. 2 illustrates a graph showing the zero-order transmission of a liquid crystal polarization grating as a change of birefringence induced by an applied voltage, in accordance with a representative embodiment, and FIG. 3 illustrates the transmission data extracted from FIG. 2 at a wavelength of 2.0 µm, in accordance with a representative embodiment. In particular, FIG. 2 shows transmission (efficiency) curves for a single CDW showing the wavelength dependence for several values of birefringence, and FIG. 3 shows a transmission (efficiency) curve for a single CDW showing the relationship between birefringence and transmittance for a single wavelength.

As shown in FIGS. 2 and 3, the results of applied voltage can be seen in at least two ways. The first (FIG. 2) is a shift of the efficiency curve along the wavelength spectrum; and the second (FIG. 3) is a change of diffraction efficiency (or transmission in this particular application) at a given wavelength. The data in FIG. 3 is extracted from FIG. 2 at a fixed wavelength of 2.0 µm. It is worth noting that neither the change in birefringence nor the change in transmission may be expected to be a linear function of the applied voltage. It is also worth noting that, by appropriate selection of the liquid crystal cell thickness of the grating, the transmission can be made to either increase or decrease attenuation with an increase in applied voltage. Thus, in some instances, an increase in voltage increases attenuation and a decrease in voltage decreases attenuation (e.g., by a known amount), and vice-versa.

As stated above, CDWs in the art have been used as attenuators for relatively narrow spectral bandwidths, but poor performance outside of the design band is expected from the efficiency shown above in Eq. 1. The performance is also affected by the cell thickness, which may be a salient factor in the switching time of the CDW. The expected switching speed that can be accomplished for reasonable cell thicknesses (e.g., on the order of about 2-4 μm) may be around 10 ms, corresponding to a frequency of about 100 Hz. By adjusting parameters and liquid crystal compounds, the time response could be substantially improved as discussed herein. Thus, the liquid crystal cell thickness may also be related to the time that it takes to reorient the liquid crystals when a voltage is applied or removed. In general, thinner cells may take less time to reorient, and are thus referred to as having faster switching times, lower response time, or higher frequency (capability). Response time may not be affected by the substrates, but instead is a combination of chemical and physical properties of the liquid crystal.

As stated above, a challenge for the application of CDWs to broadband attenuation may be that of high, uniform attenuation over a bandwidth of 2-5 μm. These challenges may be overcome using a device such as the attenuator 400 as described below with reference to FIGS. 4 and 5.

FIG. 4 illustrates an attenuator 400 with diffracted light passing through multiple gratings, in accordance with a representative embodiment, and FIG. 5 illustrates an attenuator 400 with light diffracted to a housing, in accordance with a representative embodiment.

In general, the attenuator 400 may be an optical attenuator, e.g., an achromatic mid-wave infrared attenuator. It will be understood, however, that the attenuator 400 may also or instead be used for visible, short-wave infrared, mid-wave infrared, long-wave infrared, and combinations thereof.

The attenuator 400 may be structurally configured such that it is a compact, high-speed, achromatic optical attenuator, and may thus represent an improvement to liquid crystal polarization grating (LCPG)-based attenuator technology. Though LCPGs may be advertised as broadband attenuators, they are generally not optimized to provide a level of uniformity in attenuation across the spectral band of operation. The attenuator 400 described herein may balance attenuation at several design wavelengths, with residual attenuation occurring outside of these design points. The attenuator 400 may thus yield improvement over other attenuation devices such as a circular variable neutral density (CVND) filter, which generally consists of a circular substrate with varying levels of attenuation-inducing coatings such that rotation of the filter provides a different level of attenuation (based on a region of different coating thickness). These CVNDs may generate varying levels of attenuation at different wavelengths such that the ratio of optical energy throughput at two wavelengths is a function of CVND position. This can create a near impossibility to account for in certain test environments. These and other deficiencies may be overcome using the attenuator 400 described herein.

The attenuator 400 may include a number of grating stages 420 (also known as liquid crystal polarization gratings or CDWs). The number of grating stages 420 may be arranged in a series, or otherwise in a predetermined configuration. The grating stages 420 may be the same or similar to the liquid crystal polarization gratings 100 discussed above with reference to FIG. 1. Each of the grating stages 420 may be independent from one another, e.g., such that there is no requirement on the order of elements. As a voltage is applied to each grating stage 420 (e.g., according to a lookup table stored in a memory 444 or otherwise), achromatic attenuation may be accomplished by shifting energy from the zero-order path to the ±1 diffracted orders. The energy transferred out of the zero-order path may be deflected and directed toward beam stops 414 as discussed below.

The attenuator 400 can be realized in transmission, reflection, or hybrid (combination of transmission and reflection) configurations. The diffracted light in the attenuator 400 may be controlled using a housing 410 of the attenuator 400, e.g., through the use of an absorbing coating on a wall thereof that can adequately dissipate heat induced in high-power laser applications. In cases where grating stages 420 are spaced such that diffracted light is incident on the next stage before reaching the walls 412 of the housing 410, the diffracted light from one grating stage 420 may be further diffracted away (e.g., toward the walls 412 of the housing 410 or the sides 428 of the grating stage 420) by the next grating stage 420 (FIG. 4).

As stated above, the attenuator 400 may include a housing 410 and a number of grating stages 420 arranged in a series within the housing 410. The housing 410 may comprise at least one aperture—e.g., a first aperture 411 and a second aperture 413. The first aperture 411 may include an opening for receiving a laser beam 430 at an input path 436 thereof (i.e., an input laser beam 430), and the second aperture 413 may include an exit for releasing a resultant laser beam 431 at an output path 438 thereof. The resultant laser beam 431 may be attenuated as it passes through the attenuator 400, relative to the input laser beam 430. The housing 410 may be made from a metal, e.g., aluminum, which may provide cost benefits, fabrication benefits, and weight benefits. The housing 410 may also or instead be made from another material, e.g., a polymer, a ceramic, a composite material, and so on.

The laser beam 430 discussed herein may include collimated (or approximately) collimated laser light. For example, the laser beam 430 may generally include free-space laser light. The laser beam 430 may also or instead be derived from a broadband source. In general, the laser beam 430 may be a "laser beam" as commonly referred to in the art, or the laser beam 430 may also or instead include one or more of an electromagnetic field, a beam of light, an electric field, and an energy field.

The grating stages 420 may each include a first substrate 422 and a second substrate 424, where one or more of the first substrate 422 and the second substrate 424 may be coated with a photo-alignment layer and one or more transparent electrodes, such as those described above in the context of FIG. 1. The grating stages 420 may each include a liquid crystal layer 426 disposed between the first substrate 422 and the second substrate 424 and adjacent to the photo-alignment layer.

One or more of the grating stages 420 (e.g., each grating stage 420) may be switchable responsive to a voltage 402. To this end, grating periods of a grating stage 420 may be specifically selected for attenuation. For example, the grating period of a grating stage 420 may be selected and configured such that, when the voltage 402 is applied to the grating stage 420 and a laser beam 430 is passed therethrough, optical energy from the laser beam 430 in plus and minus first orders 432 is deflected toward sides 428 of the grating stage 420 and optical energy from a zero order 434 of the laser beam 430 is allowed to pass through the grating stage 420. In this manner, when the voltage 402 is applied to each grating stage 420, attenuation of the zero order 434 of the optical energy from the laser beam 430 may be increased, where energy removed from the zero order 434 is transferred to a combination of plus and minus first orders 432.

In certain implementations, each of the grating stages 420 includes the same grating period. The grating period may be selected to provide the maximum possible plus and minus first order diffraction angles 433 with certain fabrication capabilities. The grating stages 420 may be fabricated in a reflection configuration to minimize thicknesses thereof (e.g., about half the thickness relative to transmission gratings), which may result in optimized response time and minimized losses associated with the substrates and transparent electrodes.

As shown in FIG. 4, deflected energy (e.g., optical energy from the plus and minus first orders 432) may travel through multiple grating stages 420. In this manner, energy in the plus and minus first orders 432 may be deflected from one grating stage 420 onto another grating stage 420. Thus, it is possible for deflected energy to travel through one, two, three, four, and so on, grating stages 420 before being fully absorbed, dissipated, scattered, or reflected. In general, the more grating stages 420, the more attenuation of light being passed therethrough. The number of grating stages 420 may be selected in view of the specific application of the attenuator 400.

As shown in FIG. 5, deflected energy (e.g., optical energy from the plus and minus first orders 432) may have an unimpeded path to one or more of a wall 412 (e.g., a wall 412 of the housing 410) and a beam stop 414. To this end, one or more of the wall 412 and the beam stop 414 may include a high-absorption coating 416. The high-absorption coating may include one or more of a black paint (e.g., a flat black paint), a black powder coating (e.g., a flat black powder coating), a plurality of carbon nanotubes, and a high-absorption metamaterial. One or more of the wall 412 and the beam stop 414 may also or instead include a texture selected to dissipate heat transferred by the deflected energy. As shown in the figure, one or more of the wall 412 and the beam stop 414 may be disposed on a housing 410 for the attenuator 400. In certain implementations, deflected energy may also or instead include an unimpeded path to sides 428 of one or more of the grating stages 420. In such implementations, the side 428 of a grating stage 420 may include a beam stop, or any other component that would absorb, dissipate, scatter, or reflect the deflected energy. For example, a mount for a grating stage 420 may be structurally configured to receive the deflected energy.

Energy in the plus and minus first orders 432 may be deflected at an angle consistent with the basic grating equation Energy in the plus and minus first orders 432 may be deflected at an angle consistent with the basic grating equation:

$$\sin\theta_m = \sin\theta_{in} - \frac{m\lambda}{D}, \quad \text{Eq. 2}$$

where m is the grating order (0, +1 or −1), λ is wavelength, D is grating period, and θ is the angle. In certain implementations, energy in the plus and minus first orders 432 is deflected at an angle of about 20 degrees. Because maximizing diffraction angles 433 may be advantageous, the grating period of each grating stage 420 may be selected to maximize plus and minus first order 432 diffraction angles 433. In certain implementations, the grating period of each grating stage 420 is the same. In other implementations, the grating period of each grating stage 420 is different. In general, grating periods are most likely to be equal and maximum, but they are not required to be.

The voltage 402 applied to a grating stage 420 may change a refractive index of the grating stage 420 such that a sinusoidally varying spatial pattern of the refractive index occurs.

The voltage 402 may be applied to one grating stage 420 or a plurality of grating stages 420. When applied to a plurality of grating stages 420, the voltage 402 applied to each grating stage 420 may be the same. In other implementations, the voltage 402 that is applied to a plurality of grating stages 420 may vary between gratings in the number of grating stages 420.

The grating stages 420 maybe structurally configured such that a polarization state of the laser beam 430 is maintained from an input 421 of the laser beam 430 entering the grating stage 420 through an output 423 of the laser beam 430 exiting the grating stage 420. Similarly, the polarization state of the laser beam 430 may be maintained from the input path 436 of the attenuator 400 to the output path 438 of the attenuator 400, i.e., the resultant laser beam 431 may have the same polarization state as the input laser beam 430. It will be understood that the polarization state can be maintained because the zero order of the beam is allowed to pass through each of the grating stages 420 in the attenuator 400.

The input 421 of a grating stage 420 may be aligned with the output 423 of the grating stage 420, e.g., such that the input 421 of the laser beam 430 entering the grating stage 420 is substantially co-linear with the output 423 of the laser beam 430 exiting the grating stage 420. Similarly, each grating stage 420 may be arranged such that an overall input path 436 and an output path 438 of the attenuator 400 are substantially co-linear. Alternatively, the output 423 of the laser beam 430 exiting the grating stage 420 may be disposed at an angle relative to the input 421 of the laser beam 430 entering the grating stage 420. Similarly, each grating stage 420 may be arranged such that the input path 436 and an output path 438 of the attenuator 400 are disposed at an angle relative to one another. Thus, the arrangement of the grating stages 420 can be modified to allow for the input path 436 and the output path 438 to be at right angles, anti-parallel, or any other angular relationship dictated by the application of the attenuator 400.

In contrast to systems of the prior art, sub-micron alignment of each grating stage 420 may not be needed for attenuation using the attenuator 400 described herein. In other words, in prior art systems, achromatization (the process of making the device function more uniformly across the light spectrum or sub-spectrum) is accomplished by laying gratings in a device, where each subsequent layer in the device is offset by a fraction of the grating pitch (usually on the order of several microns), requiring a sub-micron alignment of layers for devices with a moderate number of layers and fine grating pitch.

Each of the grating stages 420 may include a thickness 425 selected to achromatize the laser beam 430 through the number of grating stages 420. Achromatization and its relationship to the thickness 425 of the grating stages 420 is discussed in more detail below with reference to FIGS. 6 and 7.

The thickness 425 of the grating stages 420 as used in this disclosure will be understood to mean the thickness 425 of the liquid crystal layer 426/liquid crystal cell. This liquid crystal cell thickness 425 should not be confused with device thickness or substrate thickness. The thickness 425 of the liquid crystal layer 426 affects the distribution of energy into each diffracted order, whereas the device thickness may affect the total length of a grating stage 420 (including substrates) or overall attenuator 400 (including housing 410), depending on context. However, it is of course possible to also control or select the device thickness or substrate thickness. For example, the substrate thickness may affect how flat a surface can be maintained for a grating stage 420—generally, a thicker substrate (up to a certain point) will allow for a flatter surface to be fabricated, avoiding distortions of a laser beam 430 transmitted therethrough. However, in the present teachings, and as discussed in detail herein, the thickness 425 of the liquid crystal cell is a parameter that may be used to control attenuation.

Thus, the thickness 425 of a grating stage 420 includes the thickness 425 of the liquid crystal layer 426 as shown in FIG. 4. In certain implementations, each grating stage 420 may include a different thickness 425. The different thickness 425 of one or more of the grating stages 420 may be selected to balance a phase across a spectrum. One or more of the grating stages 420 may instead include substantially the same thickness 425. In certain implementations, the attenuator 400 may include a relatively fast response time by keeping the thickness 425 of one or more of the grating stages 420 relatively small, an option that may be made possible through the use of reflective gratings. In general, the principal of using different thicknesses 425 of grating stages 420 may be used to create a more uniform performance spectrally, and, in addition to applications using mid-wave infrared light, this concept could be extended to visible, short-wave infrared, and long-wave infrared light.

Each of the grating stages 420 may be commonly or independently controlled, e.g., by a controller 440 or the like. For example, each grating stage 420 may be commonly controlled to maintain a constant achromatization condition. Each grating stage 420 may also or instead be independently controlled to achieve a predetermined overall attenuation for the attenuator 400.

One or more of the grating stages 420 may be constructed in a reflective geometry such that the grating stages 420 include reflective gratings. One or more of the grating stages 420 may also or instead be transmissive. One or more of the grating stages 420 may also or instead be phase sensitive. Phase sensitivity may be controlled by the thickness 425 of each grating stage 420.

The number of grating stages 420 may include one or more grating stages 420. For example, the number of grating stages 420 may include at least two grating stages 420. By way of further example, as shown in FIGS. 4 and 5, the number of grating stages 420 may include at least four grating stages 420. It will be understood that more or less grating stages 420 may be included (e.g., one grating stage, three grating stages, five grating stages, six grating stages, and so on). In certain implementations, an order or arrangement of the number of grating stages 420 is interchangeable. In other implementations, the order or arrangement of the number of grating stages 420 is fixed. In certain implementations, increasing the number of grating stages 420 increases an attenuation range of the attenuator 400. Increasing the number of grating stages 420 may also or instead improve spectral flatness of a laser beam 430 passing therethrough.

The attenuator 400 may be controlled or tuned as described herein, e.g., by arrangement of the grating stages 420, by setting the thicknesses 425 of the grating stages 420, by aligning the grating stages 420, by controlling voltage 402 applied to one or more grating stages 420 (e.g., using the controller 440 or otherwise), and so on. A birefringence of one or more of the grating stages 420 may also or instead be used to tune the attenuator 400.

As discussed herein, each of the grating stages 420 may include a liquid crystal layer 426. In certain implementations, the liquid crystal included in the liquid crystal layer 426 of each grating stage 420 is the same. Alternatively, the liquid crystal included in the liquid crystal layer 426 of one or more of the grating stages 420 may be different. In other words, a liquid crystal included in the liquid crystal layer 426 may vary between gratings in the number of grating stages 420.

The spacing 450 between each of the grating stages 420 may vary, or it may be substantially the same. In certain implementations, the spacing 450 between each of the grating stages 420 is about 4 mm. The spacing 450 may be selected, based on geometry, to provide the deflected light in the plus or minus first orders to travel to a desired location within the attenuator 400. The spacing 450 may also or instead be selected to provide a desired shape or size for the overall attenuator 400.

As stated above, higher diffraction angles 433 may be desirable in certain applications. Limits on grating pitch may limit the size of the attenuator 400, where higher pitch values yield decreased grating efficiency. In the configuration shown in FIGS. 4 and 5, a four-stage attenuator 400 may be relatively compact in size. For example, using 25 mm diameter grating stages 420 may accommodate beam diameters through the attenuator 400 on the order of 8 mm. Continuing with this example, if the grating stages 420 have a flatness of about $\lambda/8$ (e.g., using glass plates that are approximately 4 mm thick), and 4 mm spacing between grating stages 420 with a diffraction angle 433 of 20 degrees (for each stage), the entire attenuator 400 would have a length of less than about 100 mm and lateral dimensions on the order of about 35 mm. For certain applications where the size of the attenuator 400 is advantageously limited along the optical path but there is freedom to grow in either the vertical or lateral dimension, a reflection configuration may be used.

As shown in FIG. 5, the attenuator 400 may be part of a system 500. Specifically, the system 500 may include a laser source 501, an attenuator 400 (e.g., including one or more of the grating stages 420 as described herein), a controller 440, a computing device 560, and a data network 570.

The laser source 501 may include a substantially collimated laser light source, a broadband source, a multi-line laser, a supercontinuum laser, and combinations thereof. For example, the laser source 501 may include one or more of an arc lamp, a light emitting diode, an infrared glower, and the like.

The controller 440 may include, or otherwise be in communication with, a processor 442 and a memory 444. The controller 440 may be electronically coupled (e.g., wired or wirelessly) in a communicating relationship with one or more of the components of the system 500. In general, the controller 440 may be operable to control one or more of the components of the system 500, e.g., to control or tune the grating stages 420 of the attenuator 400. In general, the controller 440 may be electrically coupled in a communicating relationship, e.g., an electronic communication, with any of the components of the system 500. The controller 440 may include any combination of software and/or processing circuitry suitable for controlling the various components of the system 500 described herein including without limitation processors 442, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 440 may include the processor 442 or other processing circuitry with sufficient computational power to provide related functions such as executing an operating system, providing a graphical user interface (e.g., to a display coupled to the controller 440 or another component of the system 500), set and provide rules and instructions for operation of a component of the system 500, convert sensed information into instructions, and operate a web server or otherwise host remote operators and/or activity through a communications interface 572 such as that described below.

The processor 442 may be any as described herein or otherwise known in the art. The processor 442 may be included on the controller 440, or it may be separate from the controller 440, e.g., it may be included on a computing device 560 in communication with the controller 440 or another component of the system 500. In an implementation, the processor 442 is included on or in communication with a server that hosts an application for operating and controlling components of the system 500.

The memory 444 may be any as described herein or otherwise known in the art. The memory 444 may contain computer code and may store data such as instructions for controlling the grating stages 420, or data related to performance of the attenuator 400 or system 500. The memory 444 may contain computer executable code stored thereon that provides instructions for the processor 442 for implementation. The memory 444 may include a non-transitory computer readable medium.

The system 500 may include a computing device 560 in communication with one or more of the components of the system 500 including without limitation the controller 440. The computing device 560 may include a user interface, e.g., a graphical user interface, a text or command line interface, a voice-controlled interface, and/or a gesture-based interface. In general, the user interface may create a suitable display on the computing device 560 for operator interaction. In implementations, the user interface may control operation of one or more of the components of the system 500, as well as provide access to and communication with the controller 440, processor 442, and other resources. The computing device 560 may thus include any devices within the system 500 operated by operators or otherwise to manage, monitor, communicate with, or otherwise interact with other participants in the system 500. This may include desktop computers, laptop computers, network computers, tablets, smartphones, or any other device that can participate in the system 500 as contemplated herein. In an implementation, the computing device 560 is integral with another participant in the system 500.

The data network 570 may be any network(s) or internetwork(s) suitable for communicating data and control information among participants in the system 500. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 500. The data network 570 may include wired or wireless networks, or any combination thereof. One skilled in the art will also recognize that the participants shown the system 500 need not be connected by a data network 570, and thus can be configured to work in conjunction with other participants independent of the data network 570.

Communication over the data network 570, or other communication between components of the system 500, may be provided via one or more communications interfaces 572. The communications interface 572 may include, e.g., a Wi-Fi receiver and transmitter to allow calculations and the like to be performed on a separate computing device 560. More generally, the communications interface 572 may be suited such that any of the components of the system 500 can communicate with one another. Thus, the communications interface 572 may be present on one or more of the components of the system 500. The communications interface 572 may include, or be connected in a communicating relationship with, a network interface or the like. The communications interface 572 may include any combination of hardware and software suitable for coupling the components of the system 500 to a remote device (e.g., a computing device 560 such as a remote computer or the like) in a communicating relationship through a data network 570. By way of example and not limitation, this may include electronics for a wired or wireless Ethernet connection operating according to the IEEE 802.11 standard (or any variation thereof), or any other short or long-range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 440 may be configured to control participation by the components of the system 500 in any network to which the communications interface 572 is connected, such as by autonomously connecting to the data network 570 to retrieve updates and the like.

The system 500 may include other hardware 580. In certain implementations, the other hardware 580 may include a camera, a power source, a sensor, a database, and the like. The other hardware 580 may also or instead include input devices such as a keyboard, a touchpad, a computer mouse, a switch, a dial, a button, and the like, as well as output devices such as a display, a speaker or other audio transducer, light emitting diodes or other lighting or display components, and the like. Other hardware 580 of system 500 may also or instead include a variety of cable connections and/or hardware adapters for connecting to, e.g., external computers, external hardware, external instrumentation or data acquisition systems, and the like.

In certain implementations, the attenuator 400 may be configured such that the plus and minus first orders 432 are directed laterally relative to the local optical axis, while the zero order 434 reflections from the grating stages 420 are disposed in the vertical plane. In certain implementations, the position of each grating stage 420 may be configured such that the diffracted orders from each grating stage 420 miss all other grating stages 420 as well as the first aperture 411 and second aperture 413, e.g., where the diffracted orders are terminated on one or more of grating mounts, beam stops 414, or the walls 412 of the housing 410. In an attenuator 400 designed for use with broadband energy, there may be a finite spread of the diffracted orders, where the entire extent of diffraction angles 433 should be considered when selecting the positions and periods of the grating stages 420.

Thus, an operation of an attenuator 400 as described herein may include the application of a voltage 402 across each of the grating stages 420, such as via the transparent electrode coatings on the substrates (see, e.g., the transparent electrodes 114 shown in FIG. 1, discussed above). This applied voltage 402 may affect the level of polarization in the periodic polarization structure by changing the nematic director of the liquid crystals (see, e.g., U.S. Pat. Nos. 8,305,523; 8,358,400; 8,537,310; 8,610,853; 8,982,313; and 9,195,092 to Escuti, et al., where each of the foregoing patents is hereby incorporated by reference). Through the liquid crystal anchoring (e.g., accomplished during the fabrication process), the grating period may remain fixed during operation of the attenuator 400. As the nematic director is varied, the amount of energy diffracted into the plus and minus first orders 432 may be affected, e.g., as a function of the input polarization state. As the energy in the diffracted orders increases, the energy remaining in the zero order 434 may decrease, effectively being attenuated by the applied voltage 402. As stated herein, using such polarization gratings, the polarization state of the zero order 434 may be identical to the input polarization state.

From each grating stage 420 of the attenuator 400, attenuation may be applied, multiplicatively increasing the total attenuation of the input laser light. Thus, additional stages may be provided for at least two reasons—first, to provide sufficient total attenuation in the attenuator 400 since each grating stage 420 may be limited by fabrication errors; and second, to increase uniformity of attenuation across an entire bandwidth of interest. Generally, as the number of grating stages 420 increases, the total attenuation may increase and the uniformity of the attenuation may improve since each grating stage 420 allows a degree of freedom in design (e.g., the thickness 425).

The attenuator 400 may be constructed in a transmission or reflection configuration with no loss of generality. However, for situations where the operational frequency of the attenuator 400 (or switching speed) is of interest, the reflective configuration may be preferred since the thickness 425 of the grating stage 420 may be reduced by a factor of at least two, which reduces the switching time. For example, the attenuator 400 could be manifested in a transmission form in which all grating stages 420 are transmission gratings arranged in series, which could significantly reduce the size of the attenuator 400, but at the expense of thicker gratings and slower response times. The attenuator 400 could instead operate with some number of reflection gratings with the addition of some number of standard mirrors (not pictured) to facilitate the control of diffracted orders and/or to create a desired input/output relationship (e.g., parallel, offset, anti-parallel, right angle, and so on). The attenuator 400 may include a hybrid design including some number of transmission and reflection gratings, and with or without the inclusion of standard mirrors, where the attenuator 400 can be constructed to optimize the form factor and response time for a particular application. It will be understood that, with any number of transmission grating stages 420 in the attenuator 400, the attenuator 400 may allow for some overlap of diffracted orders with grating stages 420 when designed accordingly.

Achromatization will now be discussed.

For a given grating stage (i.e., a given CDW), there are attenuation maxima that can be achieved at well-defined wavelengths. Depending on the exact spectral region of interest and choice of liquid crystal compound and liquid crystal cell thickness, the positions of these maxima can be set as desired. The performance across the band is generally governed by the efficiency function which is a cosine squared of the inverse of wavelength and generally cannot be spectrally uniform, as illustrated in FIG. 6.

Specifically, FIG. 6 illustrates the average minimum transmittance (reflectance in the case of a reflective grating) of a single grating stage in terms of transmittance corresponding to average maximum attenuation over a spectral region of 2-5 µm (the first graph 601 in the figure), and optical density corresponding to average maximum attenuation over the same spectral region of 2-5 µm (the second graph 602 in the figure), in accordance with a representative embodiment. FIG. 6 thus shows transmittance in the first graph 601 and optical density the second graph 602 as a function of wavelength for a single CDW with a relatively thin layer of liquid crystal, demonstrating that the performance may not be uniform over the spectrum. In particular, the example provided in FIG. 6 shows results for a 5.5 µm thick liquid crystal cell, with Δn=0.28.

Figure 7:
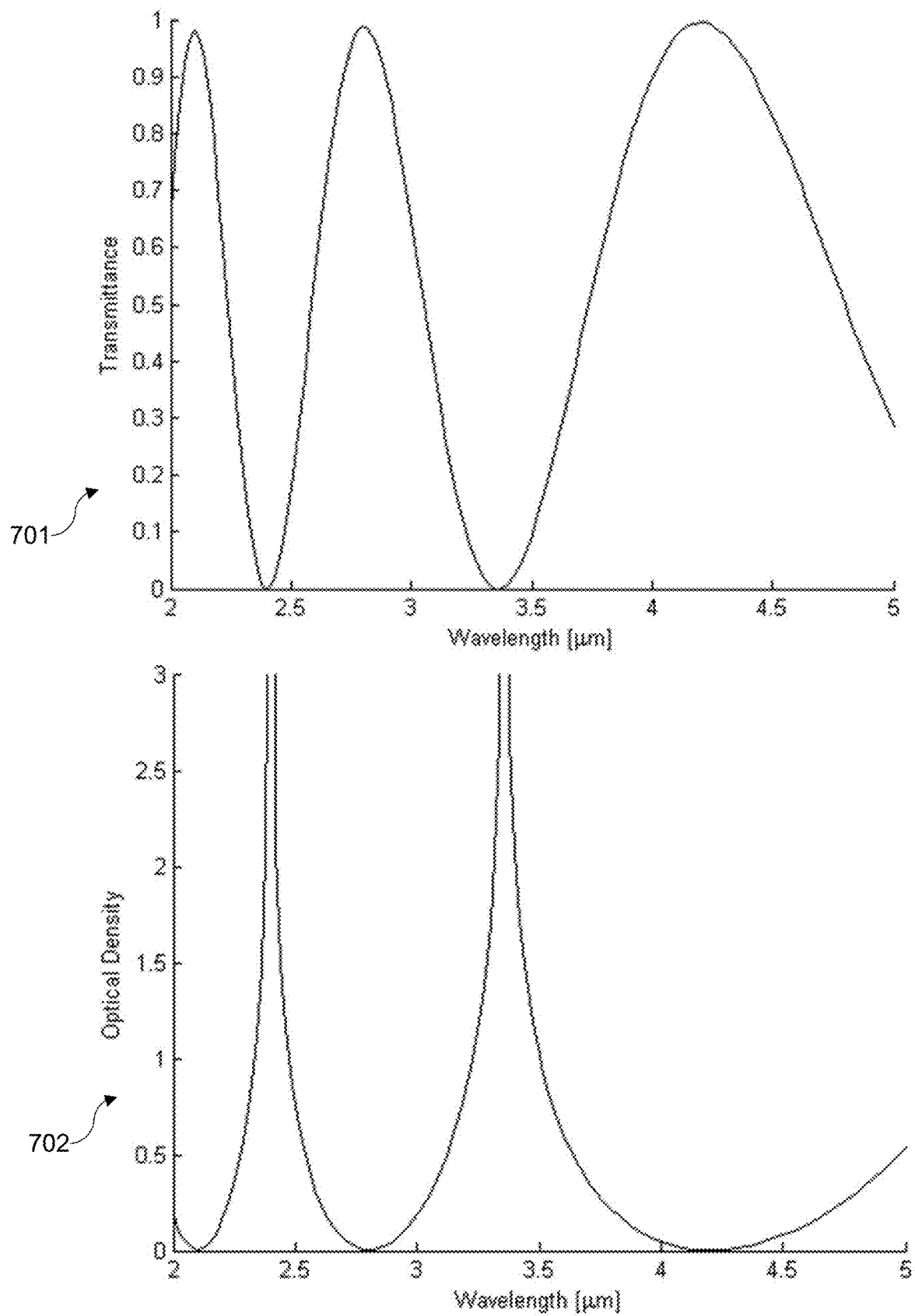
FIG. 7 illustrates the performance for a grating stage, in accordance with a representative embodiment.

FIG. 7 illustrates a theoretical performance for a grating stage, in accordance with a representative embodiment. Specifically, FIG. 7 illustrates transmittance (the first graph 701 in the figure) and optical density (the second graph 702 in the figure) as a function of wavelength for a single CDW with a relatively 'thick' layer of liquid crystal, demonstrating that the performance may not be uniform over the spectrum. In particular, the example provided in FIG. 7 shows results for a 30 µm thick liquid crystal cell, with Δn=0.28.

For the case of cascaded grating stages as described herein, the criteria of average minimum transmittance across the same spectral region can be used to determine an optimum grating thickness. This may result in a significant performance improvement relative to the single grating case described above. Specifically, uniformity of performance may improve over that of the single gating case, and the average minimum transmittance may be considerable lower. As the number of grating stages in a system increases, the uniformity may continue to improve and the average minimum transmittance may decrease (leading to more attenuation).

In certain implementations, increasing the liquid crystal cell thicknesses provides more attenuation maxima and minima (e.g., a higher order grating) and overall performance may degrade (e.g., averaged across the spectral band). Additionally, a thicker cell may slow switching time.

If, as discussed herein, a combination of CDWs is used in series, the birefringence and cell thickness for each CDW may become parameters that are used to tune the attenuator performance, e.g., to something more uniform. For a CDW attenuator with multiple CDWs, the system level efficiency for discrete, separated CDWs may be provided by Eq. 3 below:

$$\eta(\lambda) = \cos^2\left(\frac{\pi\Delta n_1 d_1}{\lambda}\right)\cos^2\left(\frac{\pi\Delta n_2 d_2}{\lambda}\right)\cos^2\left(\frac{\pi\Delta n_3 d_3}{\lambda}\right) \ldots \cos^2\left(\frac{\pi\Delta n_i d_i}{\lambda}\right), \quad \text{Eq. 3}$$

where $d_i$ is the liquid crystal cell thickness and $\Delta n_i$ is the voltage-dependent birefringence of the liquid crystal of the $i^{th}$ CDW.

There is a plurality of options for design implementations that lead to the same or similar general performance described above. One such implementation may include the use of a voltage dependent liquid crystal (as discussed above) as a control variable, and allowing the cell thickness of each grating in the system to function as a design parameter. A second approach may include the use of the liquid crystal as a design variable (selection of liquid crystal compound and/or a constant bias voltage), and allowing the cell thickness to become a control variable in which the plate separation is changed and liquid crystal fills or is evacuated from the gap appropriately. Another approach may include a combination of the aforementioned two approaches, in which the cell thickness and voltage-induced birefringence function as control variables. By way of example, the discussion below generally focuses on the first approach described above, in which grating thicknesses are held constant and the birefringence is controlled through the applied voltage.

Several options are available for system optimization, for example, including: (1) having a constant cell thicknesses ($d_i=d$ for all i); (2) having a constant liquid crystal compound ($\Delta n_i=\Delta n$ for all i); and (3) having neither cell thickness nor compound be constant. Because the efficiency of a CDW may be dependent on the product $\Delta nd$, there may be little advantage from varying the compound, i.e., if you vary the cell thickness. For example, the switching time of the CDW may increase with cell thickness, such that minimizing the cell thickness may be desirable. Thus, for a given value of $\Delta nd$, minimization of the cell thickness may require maximum birefringence. Similarly, because the efficiency of a CDW may be dependent on the product 4nd, the compound may be varied in lieu of, or in addition to, varying the cell thickness. An advantage that may be found from using different liquid crystal compounds may include a simplification of the fabrication process, e.g., if the cell thicknesses remain constant.

For the sake of simplicity, with no loss of generality, the discussion below includes optimizations through varying only the cell thickness parameter. Typical applications may include a maximum average attenuation (minimum average transmission) or minimized standard deviation of attenuation.

Because the analytical approach to optimization may not be feasible or practical, especially for systems with a larger number of elements, various numerical optimization methods may be applied. Generally, for a small number (e.g., 2-5) of CDWs in a system, a "brute force" method of evaluation can be employed through a simple computer routine. For larger numbers of CDWs, more rigorous numerical methods may be applied. Any of the computing components described herein may perform such calculations and evaluations.

The design of several example attenuator systems will now be discussed.

One example is similar to that shown in, e.g., FIGS. 4 and 5. In this example, a system includes four CDWs in series, with grating thicknesses of 6.25 μm, 6.75 μm, 8.0 μm, and 8.5 μm. As discussed above, the order of the CDWs in the attenuator system may be irrelevant. It should be understood that this example may not represent an optimal attenuator system, but is provided by way of example only.

Figure 8:
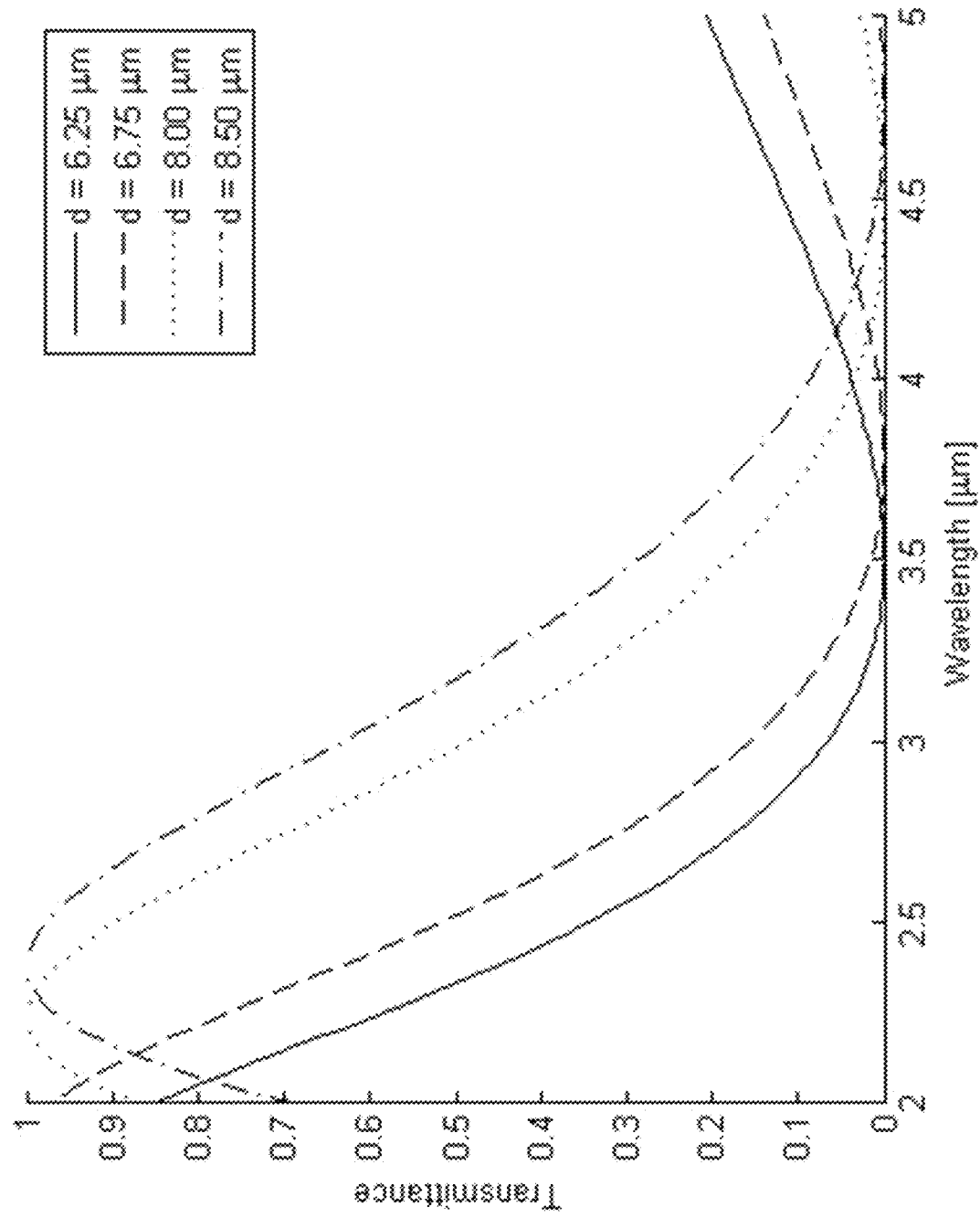
FIG. 8 illustrates efficiency curves in an attenuator system, in accordance with a representative embodiment.
Figure 9:
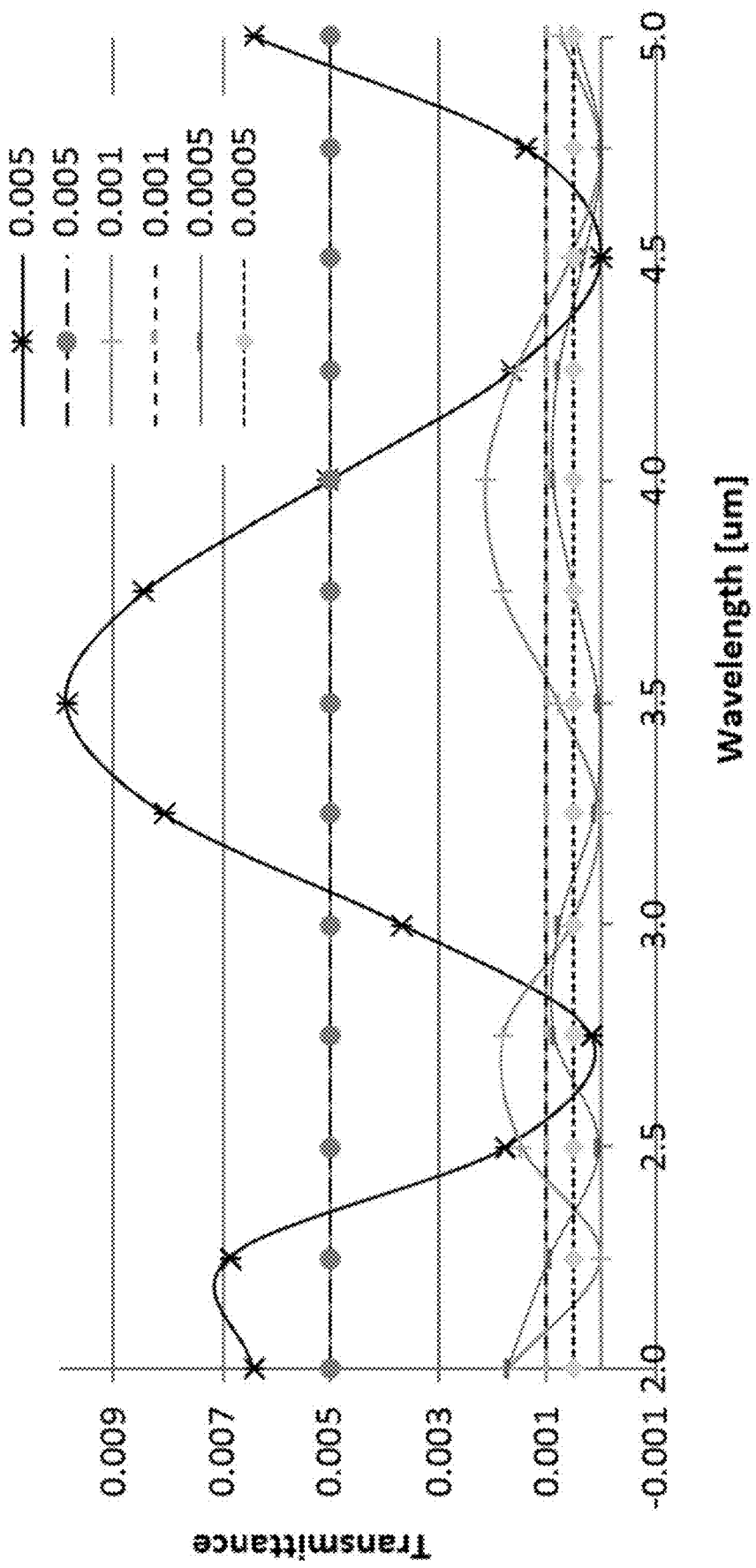
FIG. 9 illustrates efficiency curves in an attenuator system, in accordance with a representative embodiment.
Figure 10:
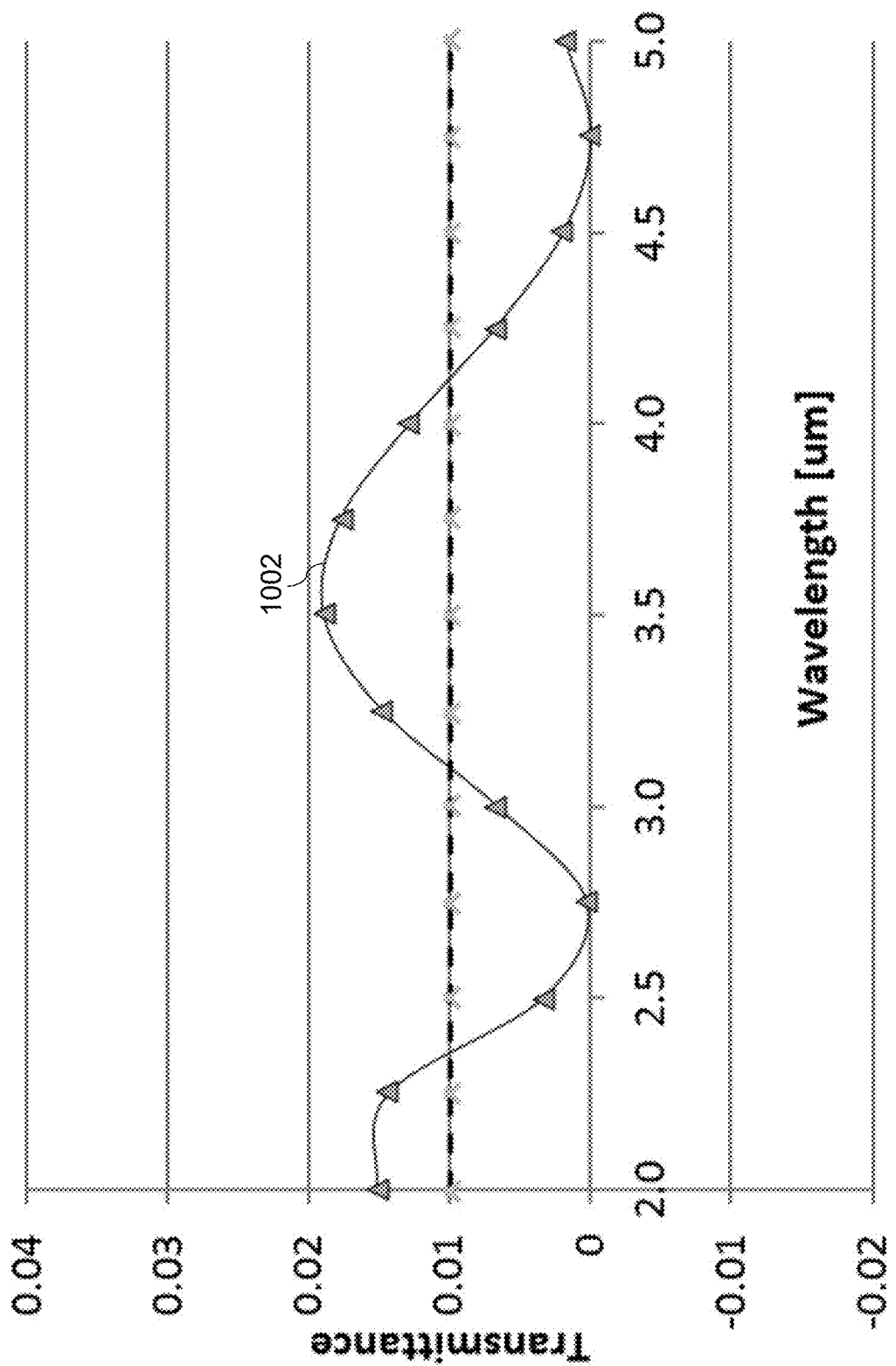
FIG. 10 illustrates a close-up view of the data for T=0.01 from FIG. 9, in accordance with a representative embodiment.
Figure 11:
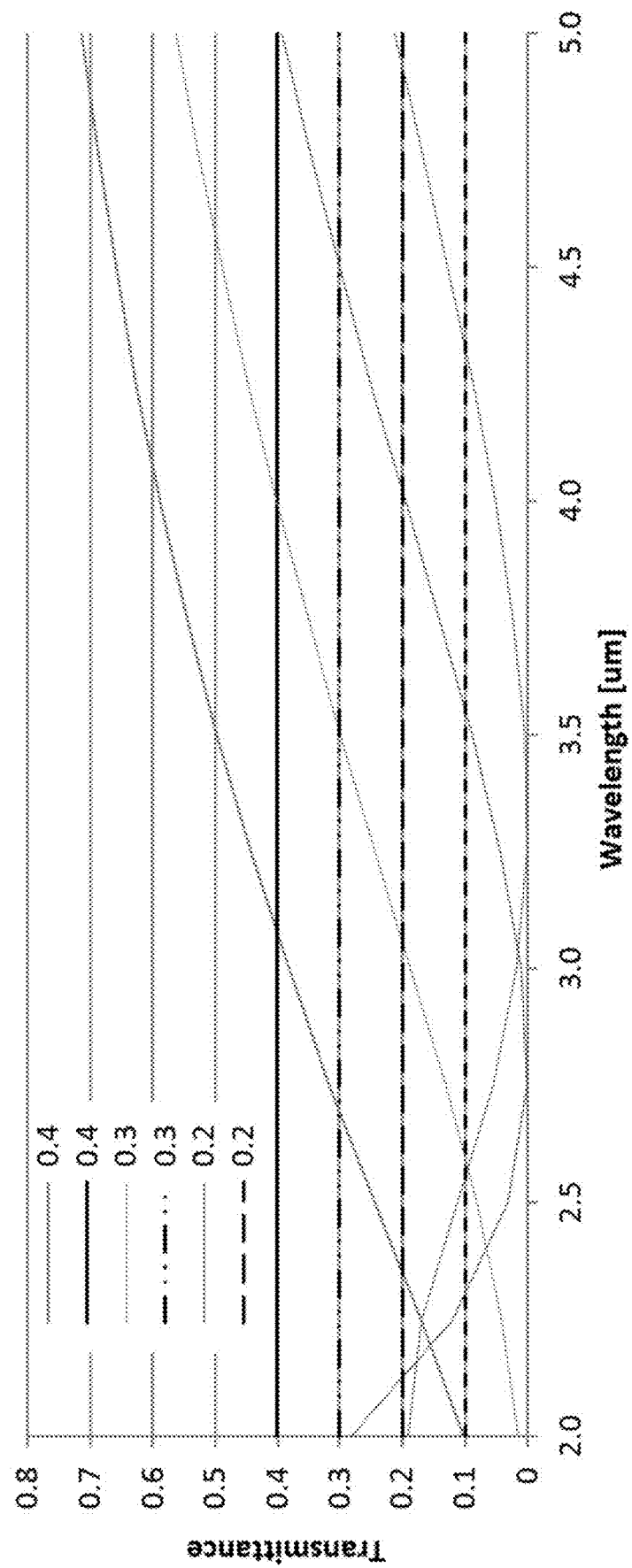
FIG. 11 illustrates transmittance levels for an attenuator system, in accordance with a representative embodiment.

FIGS. 8-10 illustrate efficiency curves in an attenuator system, in accordance with a representative embodiment. Specifically, FIG. 8 illustrates efficiency curves as a function of wavelength in the example attenuator system with four stages as set forth above (i.e., with grating thickness of d=6.25 μm, d=6.75 μm, d=8.00 μm, and d=8.50 μm), where the efficiency curves are plotted over a spectral region of interest. FIG. 9 illustrates the curves for T=0.005, 0.001 and 0.0005, and FIG. 10 illustrates a close-up view of the data for T=0.01 from FIG. 9. Thus, FIG. 9 shows system level transmittance for an example attenuator system with four stages demonstrating improved flatness over the spectrum for several transmittance levels, and FIG. 10 shows system level transmittance for the attenuator demonstrating the performance (the curved line 1002) for a desired transmittance of 0.01 (optical density of 2). FIG. 11 illustrates higher transmittance levels for the attenuator system. In other words, FIG. 11 shows system level transmittance for an example attenuator system with four stages over the spectrum for several higher transmittance levels.

The data shown in FIG. 9 and FIG. 10 demonstrate that better spectral performance across a very broad spectrum may be achieved using multiple CDWs in series rather than a single CDW. The spectral uniformity of attenuation may be better at higher attenuation levels (lower transmission) than for high transmission values. In general, better performance may be expected as the number of CDWs in a system is increased.

Figure 12:
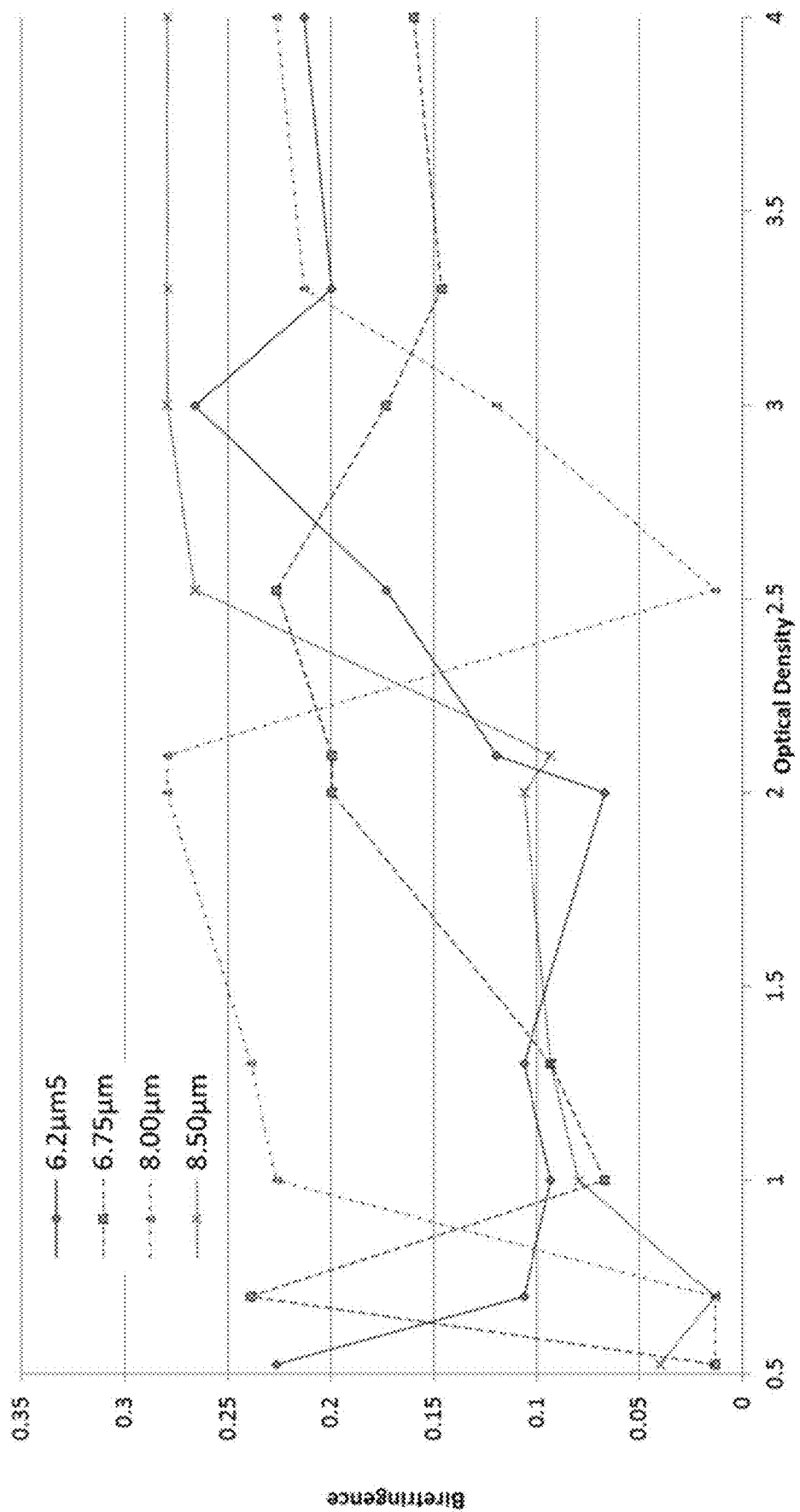
FIG. 12 illustrates birefringence values for an attenuator system, in accordance with a representative embodiment.

FIG. 12 illustrates birefringence values for an attenuator system, in accordance with a representative embodiment. Specifically, FIG. 12 illustrates birefringence values for each CDW to accomplish the spectrally corrected performance shown in FIG. 9 and FIG. 10. More specifically, shown in FIG. 12 are the birefringence values of each CDW for each system attenuation level. The birefringence may be varied through applied voltage, where the voltage to adjust a given CDW's birefringence is a function of the particular liquid crystal compound and cell thickness. The tabular data shown in FIG. 12 in plot form may function as one step in a lookup table operation for attenuator control, e.g., using any of the computing components described herein. An additional step may include data lookup of applied voltage to obtain a given birefringence for each cell, e.g., data lookup in a database or memory 444 such as that described above.

There may be little difference in optimizing a four-stage system for average or minimum standard deviation criteria. True zero (infinite optical density) points may not be expected to be achieved, e.g., due to fabrication errors, impurities, and scattering. Examples of cell thicknesses in a four-stage system with average maximum criteria are: (i) 3.8 μm; (ii) 4.7 μm; (iii) 6.3 μm; and (iv) 8.3 μm. For minimum standard deviation, these cell thicknesses become: (i) 3.7 μm; (ii) 4.6 μm; (iii) 6.2 μm; and (iv) 8.4 μm. Thus, the design process can be based on any optimization criteria depending on the application specifics. As an example, the optimization criteria could be the averaged attenuation across the spectrum where the average value of the design is meant to be as near as possible to the required value. As another example, the criteria could seek to minimize the standard deviation across the spectrum, calculated between the desired attenuation and that of a design. For a four-stage attenuator system, there may be little difference in the results of designing and optimizing a system with either of the above criteria.

In certain implementations, the voltage is applied substantially identically for each CDW. However, more degrees of freedom are available if the voltages applied to the CDWs are allowed to differ, although calibration processes can be cumbersome.

Figure 13:
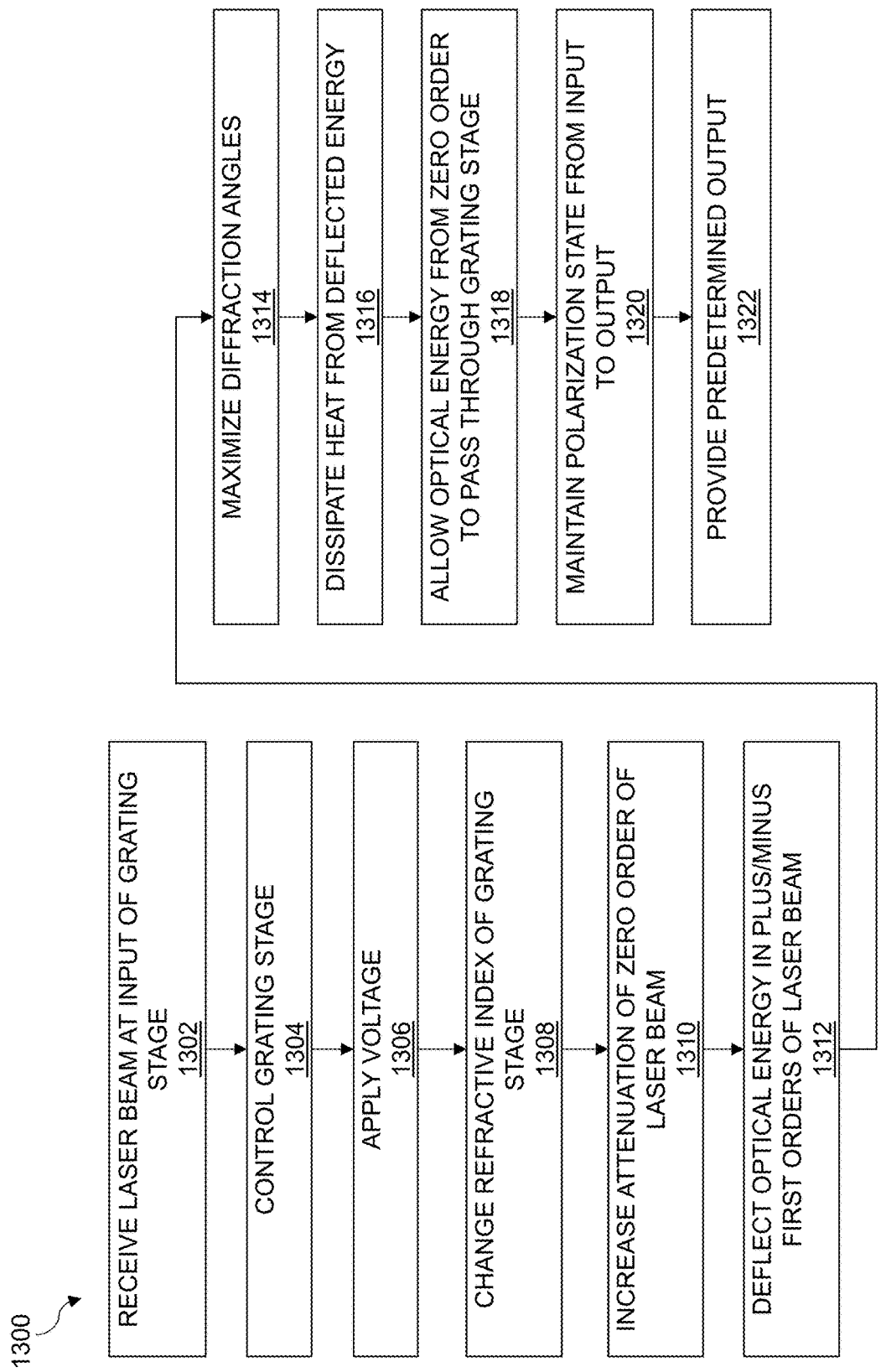
FIG. 13 is a flow chart of a method of attenuation, in accordance with a representative embodiment.

FIG. 13 is a flow chart of a method of attenuation, in accordance with a representative embodiment. The method 1300 may generally include the functionality of an optical attenuator as described herein, e.g., a design flow.

As shown in box 1302, the method 1300 may include receiving a laser beam at an input of a number of grating stages, e.g., one or more grating stages of an attenuator. As discussed herein, the grating stages included in the number of grating stages may be arranged in a series and may be configured to accept a voltage. Each grating stage in the number of grating stages may include a liquid crystal layer disposed between a first substrate and a second substrate, where one or more of the first substrate and the second substrate is coated with a photo-alignment layer adjacent to the liquid crystal layer and coated with transparent electrodes.

As shown in box 1304, the method 1300 may include controlling a grating stage in the number of grating stages. This may include commonly controlling each grating stage. This may instead include independently controlling each grating stage, or some combination of common control and independent control. For example, independently controlling one or more of the grating stages may include differing a voltage applied to each grating stage. Controlling one or more of the grating stages may also or instead include controlling phase (wavelength) sensitivity by controlling a thickness of one or more of the grating stages. Controlling one or more of the grating stages may also or instead include increasing an attenuation range by increasing the number of grating stages. As discussed herein, controlling a grating stage may be done, in whole or in part, using a controller.

As shown in box 1306, the method 1300 may include applying a voltage to one or more of the grating stages. The voltage may be applied using a power source in electrical communication with a controller or the like.

As shown in box 1308, the method 1300 may include changing a refractive index of each grating stage such that a sinusoidally varying spatial pattern of the refractive index occurs. Changing the refractive index of a grating stage may occur through the application of the voltage thereto.

As shown in box 1310, the method 1300 may include increasing an attenuation of the zero order of the laser beam by transferring energy from the zero order to a combination of plus and minus first orders.

As shown in box 1312, the method 1300 may include deflecting optical energy from the laser beam in plus and minus first orders toward a side of each grating stage. It will be understood that this deflection can occur at a given angle, and that being deflected toward the side of the grating stage can include being deflected to a wall of a housing of the attenuator, being deflected to a beam stop, being deflected to the actual edge or side of the grating stage, and combinations thereof.

As shown in box 1314, the method 1300 may include maximizing plus and minus first order diffraction angles, or otherwise deflecting the optical energy from the laser beam in plus and minus first orders at predetermined angles or along predetermined paths.

As shown in box 1316, the method 1300 may include dissipating heat from the deflected optical energy. As discussed herein, this can occur using beam stops, walls, coatings, or other materials, e.g., on one or more of the housing, the gratings themselves, supports/mounts, or otherwise.

As shown in box 1318, the method 1300 may include allowing optical energy from a zero order of the laser beam to pass through each grating stage.

As shown in box 1320, the method 1300 may include maintaining a polarization state of the laser beam from the input of a grating stage to an output of the grating stage. This may also or instead include maintaining a polarization state of the laser beam through the number of grating stages, and therefore through the attenuator itself. Thus, a polarization state of the laser beam may be maintained from the input of the number of grating stages to an output of the number of grating stages.

The laser beam may also be achromatized when passing through the number of grating stages. Achromatization may be accomplished through a selection of the thickness of each grating stage.

As shown in box 1322, the method 1300 may include providing a predetermined output of the laser beam, e.g., through each grating stage or through all grating stages in series. For example, this may include maintaining co-linearity of the laser beam from the input to the output. This may instead include maintaining another alignment (e.g., a predetermined angular alignment) of the laser beam from the input to the output.

Figure 14:
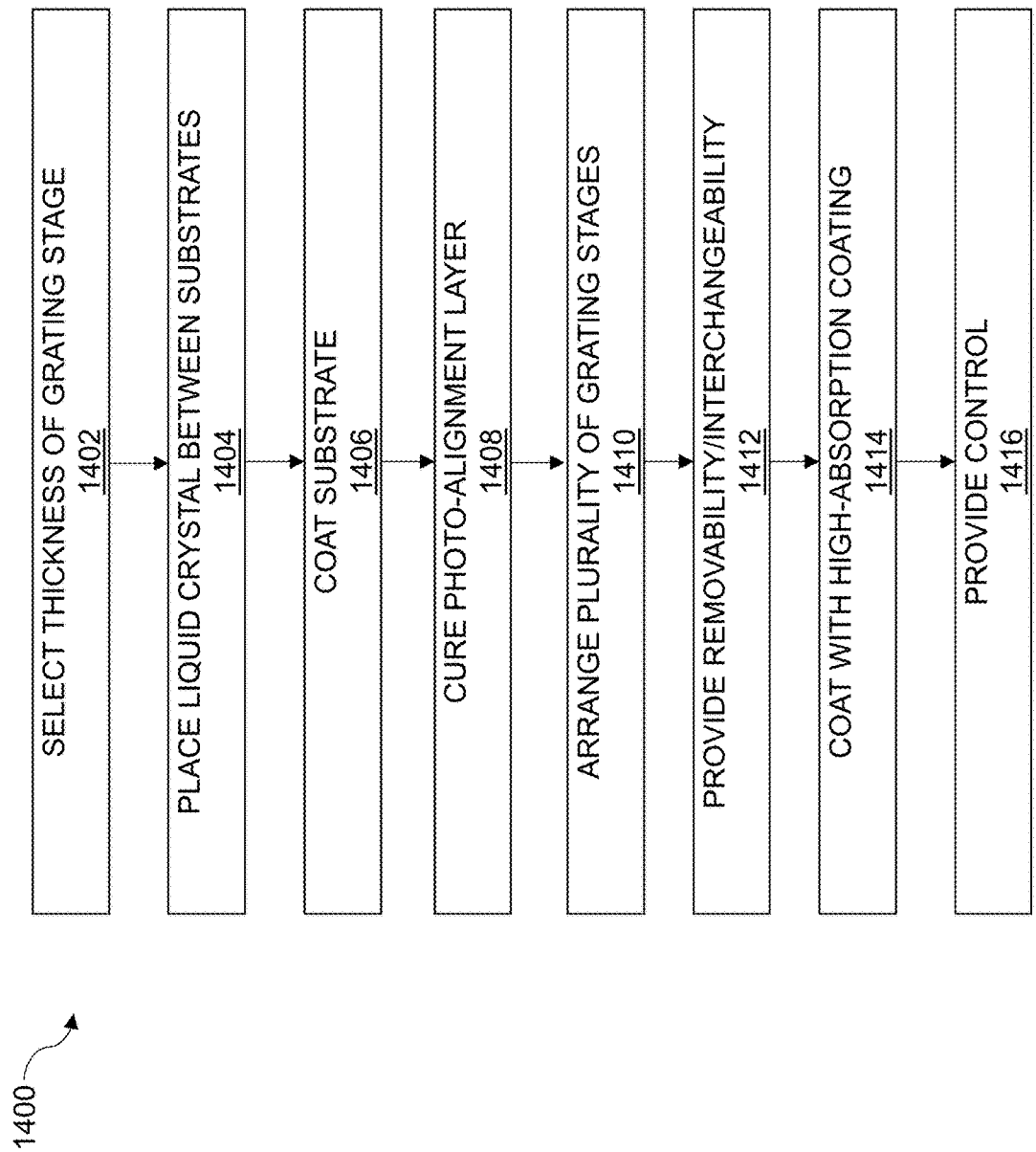
FIG. 14 is a flow chart of a method of making an attenuator, in accordance with a representative embodiment.

FIG. 14 is a flow chart of a method of making an attenuator, in accordance with a representative embodiment. The method 1400 may generally include making an optical attenuator as described herein.

As shown in box 1402, the method 1400 may include selecting a thickness of a grating stage to achromatize a laser beam passed therethrough. The thickness may also or instead be selected to otherwise affect light passed through an attenuator or grating stage thereof.

As shown in box 1404, the method 1400 may include placing a liquid crystal layer between a first substrate and a second substrate to create one or more of the grating stages included in a plurality of grating stages for an attenuator.

As shown in box 1406, the method 1400 may include coating one or more of the first substrate and the second substrate with a photo-alignment layer adjacent to the liquid crystal layer and with transparent electrodes such that the grating stage is switchable responsive to a voltage. The grating period of the grating stage may be selected such that, when the voltage is applied thereto and a laser beam is passed therethrough, optical energy from the laser beam in plus and minus first orders is deflected toward sides of the grating stage and optical energy from a zero order of the laser beam is allowed to pass through the grating stage. The grating stage may be configured such that a polarization state of the laser beam is maintained from an input of the laser beam entering the grating stage through an output of the laser beam exiting the grating stage.

As shown in box 1408, the method 1400 may include curing the photo-alignment layer of the grating stage in a cycloidal pattern to anchor the liquid crystal layer thereby creating a base for a sinusoidal pattern.

As shown in box 1410, the method 1400 may include arranging a plurality of grating stages in a series within a housing, which may thereby form an attenuator or part of an attenuator.

As shown in box 1412, the method 1400 may include providing one or more of removability and interchangeability for one or more of the grating stages included in the plurality of grating stages.

As shown in box 1414, the method 1400 may include coating one or more of a wall of the housing, a beam stop, a mount, and the side of a grating stage with a high-absorption coating.

As shown in box 1416, the method 1400 may include providing a control (e.g., a controller as described herein) for applying the voltage to the grating stage, or performing other additional functionality for the attenuator.

In general, described herein are devices, systems, methods, and techniques for attenuation, e.g., a simplified manner to improve CDW performance in a broadband attenuation application. As described herein, CDWs may exhibit desirous characteristics for broadband attenuator applications, such as the preservation of a zero-order polarization state, no mechanical motion, ease of diffracted order control, few diffraction orders to manage, and so on. Through the use and improvement in liquid crystal compounds, CDWs may become an appealing option for many broadband attenuator applications. It will be understood that, though the discussions herein generally apply to free-space applications, the techniques could also or instead be applied to fiber communication systems, e.g., with appropriate modifications.

Attenuation as described herein may be used for laser safety mechanisms, e.g., for multi-line, mid-wave infrared laser systems that are difficult to shut down rapidly without damaging the laser system in the case of a safety interlock engagement. Attenuation as described herein may also or instead be used for infrared projection systems. Attenuators described herein may be compact, lightweight, and physically robust. The attenuators may thus be relatively easy to insert into a larger system, e.g., the attenuators may be modular. Attenuation as described herein may be used for spatial light modulation. Also, attenuation as described herein may be used in tunable optical filter applications.

Some other potential applications for attenuation as described herein may include communications (such as band hopping optical communicators and dynamic response encryption), entertainment (e.g., gaming, virtual reality, gaming uniforms for light attenuation, holodeck, and augmented reality or magic leap light attenuation), self-driving such as unmanned aerial vehicles (UAVs), semiconductors such as for mask and reticle production, solar industry (e.g., a tunable filtered, optimized solar panel, or a harvester solar panel), optoelectronics (e.g., tunable transparent glass, digital light processing, digital mirrors, a tunable camera for a mobile phone, a broad spectrum flashlight that is tunable, and a visible or infrared camera switch), and security (e.g., light/polar induced camouflage, cloaking, an airport laser pointer counter measure, an airplane windshield laser filter, conference room privacy walls, surveillance defense security such as an anti-laser listening device, and a decoy laser for countermeasures or the like).

Other advantages of attenuation as described herein may include a reduction of the fabrication complexity inherent in the prior art, e.g., because techniques described herein may allow for the same grating period and liquid crystal to be used on all gratings with relatively no alignment sensitivity. This may allow for all grating stages to be fabricated with a single manufacturing configuration (e.g., laser alignments and the like), which can reduce fabrication time and costs. Further, significant spectral improvement may be realized relative to single grating devices. Techniques described herein may also provide improved spectral performance over existing CVND technology, while simultaneously reducing size, weight, and power requirements of an attenuator device. Additionally, the original laser beam characteristics (e.g., polarization, profile, and color ratio) may be maintained in the disclosed devices, systems, and methods. Further, insertion losses of techniques described herein may be similar to, or less than, CVNDs. Residual spectral non-uniformity may also or instead be constant using the disclosed techniques.

Part II—Projection

The techniques described in Part I above for optical attenuation may be implemented for use in a projector, i.e., by using liquid crystal polarization gratings to modulate light for a projection device or system. In other words, features of liquid crystal polarization grating based attenuator systems described above, in which a plurality of gratings are each designed with specific liquid crystal layer thicknesses to allow for more uniform performance across an extended spectral region, can be used in projector technology, such as scene projection. Scene projection in the mid-wave infrared spectrum may be used in the test and evaluation field, e.g., as resistor arrays and the like. In other words, techniques described in Part I above may be implemented to generate a broader spectral band of usefulness for a projector in a same or similar manner as in an optical attenuator application.

Figure 15:
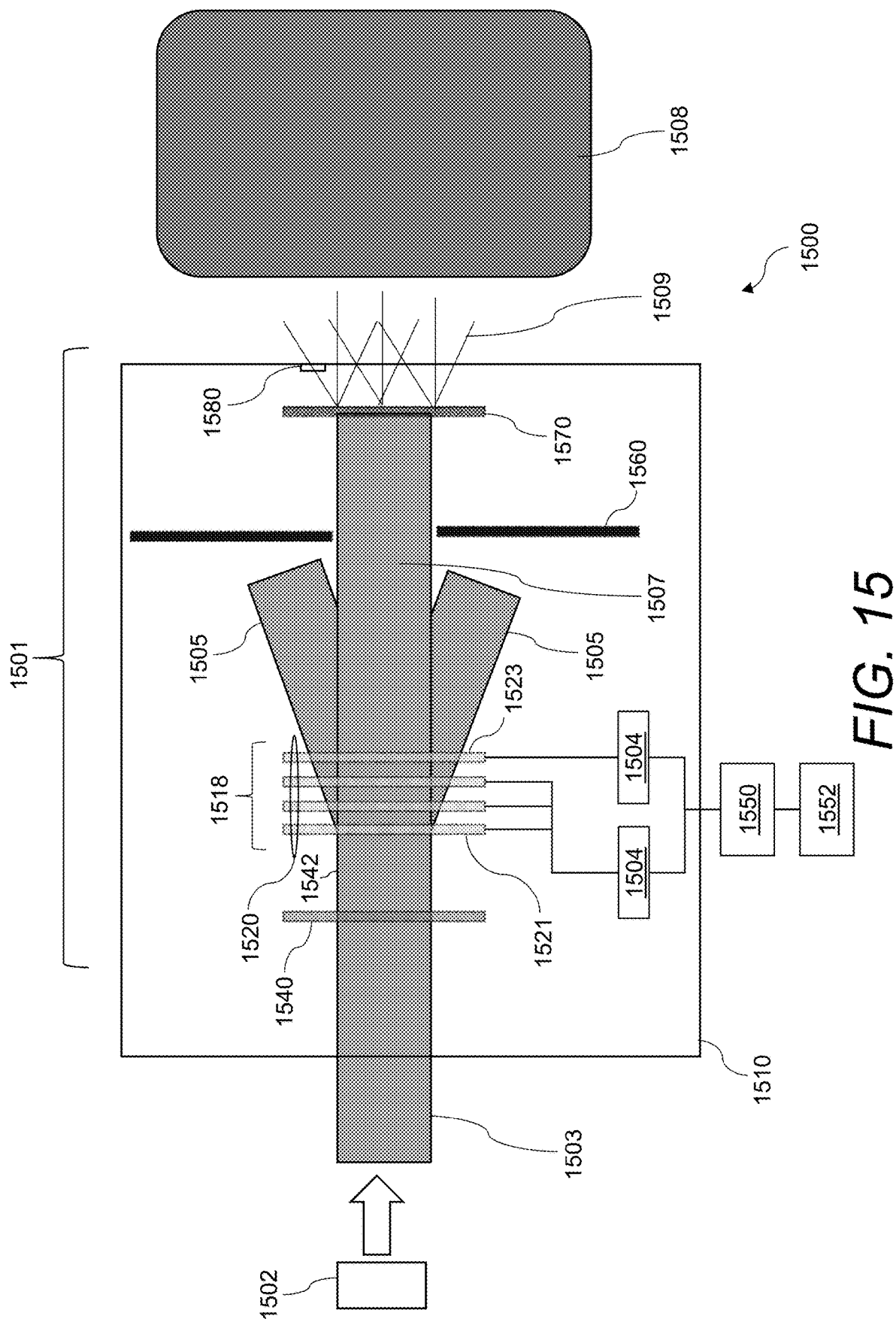
FIG. 15 illustrates a projector system, in accordance with a representative embodiment.

FIG. 15 illustrates a projector system 1500, in accordance with a representative embodiment. The system 1500 may include a projector 1501 and a light source 1502. The projector 1501 may include a housing 1510, a beam homogenizer 1540, a spatial light modulator 1518, an aperture 1560, an optical element 1570, and a projection optic element 1580.

The light source 1502 may include one or more of a laser source, a light-emitting diode (LED), a blackbody, and a light bulb. In certain implementations, light 1503 from the light source 1502 includes a laser beam. Specifically, light 1503 from the light source 1502 may include one or more of an expanded laser beam and a combination of a plurality of laser beams, which may have different wavelengths.

The beam homogenizer 1540 may be structurally configured to receive light 1503 from the light source 1502. The beam homogenizer 1540 may create a predetermined illumination 1542 from the light 1503 that it receives from the light source 1502. In certain implementations, the predetermined illumination 1542 created by the beam homogenizer 1540 is a substantially uniform illumination of light onto each of a plurality of pixels (shown, e.g., in FIG. 16, described below) included on a first grating stage 1521 of a number of grating stages 1520 in the spatial light modulator 1518.

The spatial light modulator 1518 may include a number of grating stages 1520 (i.e., one or more grating stages 1520) structurally configured to receive the predetermined illumination 1542 from the beam homogenizer 1540. The grating stages 1520 may be the same or similar to the gratings described elsewhere herein, e.g., in Part I above, but the grating stages 1520 may be divided into, or may otherwise be formed by, a plurality of pixels. For example, each grating stage 1520 in the number of grating stages 1520 may include a plurality of pixels where corresponding pixels in each of the number of grating stages 1520 are aligned with one another (shown, e.g., in FIG. 16, described below).

Similar to the gratings described with reference to optical attenuation in Part I above, each of the plurality of pixels in the grating stages 1520 of the spatial light modulator 1518 may include a liquid crystal layer disposed between two substrates—e.g., where the liquid crystal layer and the two substrates are the same or similar to any as discussed above in Part I. For example, one or more of the two substrates may be coated with a photo-alignment layer adjacent to the liquid crystal layer, and one or more of the two substrates may be coated with transparent electrodes such that a pixel can be electrically biased by a voltage 1504. It will be understood that the substrate being coating with the photo-alignment layer may include the application and curing of the photo-alignment layer—e.g., curing with appropriate light to create a predetermined pattern in the grating.

At least a pixel in the plurality of pixels in the grating stages 1520 of the spatial light modulator 1518 may be switchable by applying a voltage 1504 thereto. Similar to the gratings described with reference to optical attenuation in Part I above, a grating period of the pixel may be selected such that, when the voltage 1504 is applied to the pixel and light 1503 is passed therethrough, optical energy from the light 1503 in plus and minus first orders 1505 is deflected toward sides of the pixel and optical energy from a zero order 1507 of the light 1503 is allowed to pass through the pixel. In this manner, the voltage 1504 may reduce light 1503 passing through the pixel by a distribution of the light 1503 to the plus and minus first orders 1505. Also, in this manner, the polarization state of the light 1503 may be maintained from an input of the light entering the pixel (e.g., the predetermined illumination 1542 entering the first grating stage 1521 of the spatial light modulator 1518) through an output of the light exiting the pixel (e.g., the zero order 1507 of the light 1503 exiting the last grating stage 1523 in a plurality of grating stages 1520 of the spatial light modulator 1518). Thus, the polarization state of light 1503 may be maintained through the spatial light modulator 1518.

In certain implementations, each pixel is independently switchable. For example, each pixel may be independently switchable between a first state and a second state when a predetermined voltage is applied. The predetermined voltage may be equal to a maximum voltage from a power source 1552. The predetermined voltage may also or instead be fixed or controllable between a range of voltages. Pixels may also or instead be switchable in groups, where a plurality of pixels are switchable together with one another.

As shown in the figure, the voltage 1504 may be controlled by a controller 1550, which may be the same or similar to any of the controllers described elsewhere herein, e.g., in Part I above. The same voltage 1504 may be applied to each grating stage 1520 (or pixels of one or more grating stages 1520), or a different voltage 1504 may be applied to each grating stage 1520 (or pixels of one or more grating stages 1520). For example, each pixel may be individually in electrical communication with a controller 1550 or power source 1552. Also, or instead, a voltage 1504 may be applied to an entire grating stage 1520 of the number of grating stages 1520, e.g., instead of individually coupling each pixel thereof. The voltage 1504 applied to an entire grating stage 1520 may be fixed or controllable between a range of voltages. In certain implementations, the voltage 1504 applied to a first grating stage 1521 is substantially equal to the voltage 1504 applied to a second grating stage (e.g., the last grating stage 1523). In other implementations, the voltage 1504 applied to a first grating stage 1521 is substantially different than the voltage 1504 applied to a second grating stage (e.g., the last grating stage 1523).

As stated above, the grating stages 1520 may be the same or similar to the gratings described elsewhere herein, e.g., in Part I above. As such, similar to the gratings discussed above, a thickness of each of the number of grating stages 1520 in the spatial light modulator 1518 (i.e., the thickness of the liquid crystal layer) may be selected to affect light 1503 passing therethrough, e.g., the thickness may be selected to achromatize light 1503 through the number of grating stages 1520. Thus, in certain implementations, the thickness of the liquid crystal layer (of one or more of the pixels) may be selected to affect performance of the projector 1501.

In certain implementations, the projection system 1500 produces unpolarized light at the output of the spatial light modulator 1518 (the pixel array). In this manner, for the system 1500 shown in FIG. 15, whatever polarization state is used as an illumination source (the light 1503) may be propagated through the system 1500. Thus, if unpolarized light is used at the input, the spatial light modulator 1518 may output unpolarized light as well.

The aperture 1560 may be structurally configured to block light in the plus and minus first orders 1505 that is deflected by one or more of the pixels in the grating stages 1520. For example, the aperture 1560 may block light deflected by one or more pixels of a single grating stage 1520 of the spatial light modulator 1518, or the aperture 1560 may block light deflected by one or more pixels of a plurality of grating stages 1520 of the spatial light modulator 1518. Thus, in general, the aperture 1560 may be used to block the light from the diffracted orders from propagating through the system 1500.

The aperture 1560 may be a standalone component of the projector 1501 or system 1500, or the aperture 1560 may be part of (e.g., formed on or integral with) another component of the projector 1501 or system 1500. For example, at least a part of the aperture 1560 may be independent from the spatial light modulator 1518 as shown in the figure. Alternatively, at least a part of the aperture 1560 may be included on the spatial light modulator 1518. For example, sides of the grating stages 1520 may be used to block light from the diffracted orders, and, in this manner, the sides of the grating stages 1520 may act as at least a part of an aperture 1560 as described herein. Also, or instead, portions of the housing 1510 may be used to block light from the diffracted orders, and, in this manner, portions of the housing 1510 may act as at least a part of an aperture 1560 as described herein. To this end, sides of the grating stages 1520, or portions of the housing 1510, may include a beam stop having a high-absorption coating.

The optical element 1570 may be disposed downstream from the number of grating stages 1520 to condition light 1503 that is output from the number of grating stages 1520 for projection—e.g., to condition the zero order 1507 of the light 1503 that is output from the number of grating stages 1520. The optical element 1570 may condition the light 1503 such that the pixels appear to emit the light 1503 into a cone. To this end, the optical element 1570 may include one or more of a diffuser and a lenslet array. Also, or instead, the optical element 1570 may include a collimating lens or a scan lens. In certain implementations, a diffuser is used after the grating stages 1520 to transform energy from collimated energy (where all of the light 1503 remains in one well-defined beam) to a form that makes each pixel appear to "emit" into a cone. A diffuser may be preferred for use in projection systems 1500 for test and evaluation purposes, for example.

The system 1500 may include one or more projection optic elements 1580 (e.g., projection optic system) disposed downstream of the optical element 1570. For example, the projection optic elements 1580 may include a scan lens or the like. It will be understood that a projection optic element 1580 may or may not be included depending on the application. A projection optic element 1580 may include a lens or a system of lenses, a mirror or a system of mirrors, a diffractive element, a combination of the foregoing, or another optical device to focus, collimate, distort, or in another manner, modify or condition light output from the projection optic element 1580.

The system 1500 further shows a projection 1508, which may include projected light 1509 that forms an image or the like. By way of example, the system 1500 may be used as a display such as for a computer monitor, a mobile phone, a tablet, or a television, where a projection optic element 1580 would likely not be used. The system 1500 may also or instead be used to present optical information to a device such that the optical information appears to originate from a distance other than the actual distance between test article and the system 1500, and then a collimator, a lens, or a mirror may be used. For a use case where the output of the system 1500 is intended to be projected to a non-planar surface, a projection optic element 1580 may be used to add appropriate distortion to the system output to conform it to the non-planar surface.

As stated above, the system 1500 or projector 1501 may include a housing 1510 containing one or more of the light source 1502, the beam homogenizer 1540, the spatial light modulator 1518, the aperture 1560, an optical element 1570, and a projection optic element 1580 (e.g., projection optic system).

Thus, shown in FIG. 15 is an example of a projection system 1500 where light 1503 (e.g., an expanded laser beam or multiple combined laser beams of different wavelength) passes through a beam homogenizer 1540 to create a substantially uniform illumination (e.g., substantially equal illumination on all pixels), which may promote optimum performance in the system 1500. The active item in the system 1500 may include the grating stages 1520 of the spatial light modulator 1518, where four such grating stages 1520 are shown, but another number of grating stages 1520 is of course possible (e.g., one, two, three, five, and so on). The grating stages 1520 may be the same or similar to the gratings discussed above in Part I, but rather than being one large grating or cell of equal attenuation, the grating stages 1520 may include an array of attenuator pixels. In this manner, the grating stages 1520 may be aligned such that light 1503 passing through a given pixel on a first grating stage 1521 also passes through a corresponding given pixel on a next grating stage 1520. Also, each pixel may be individually addressable for application of a voltage 1504 thereto.

Figure 16:
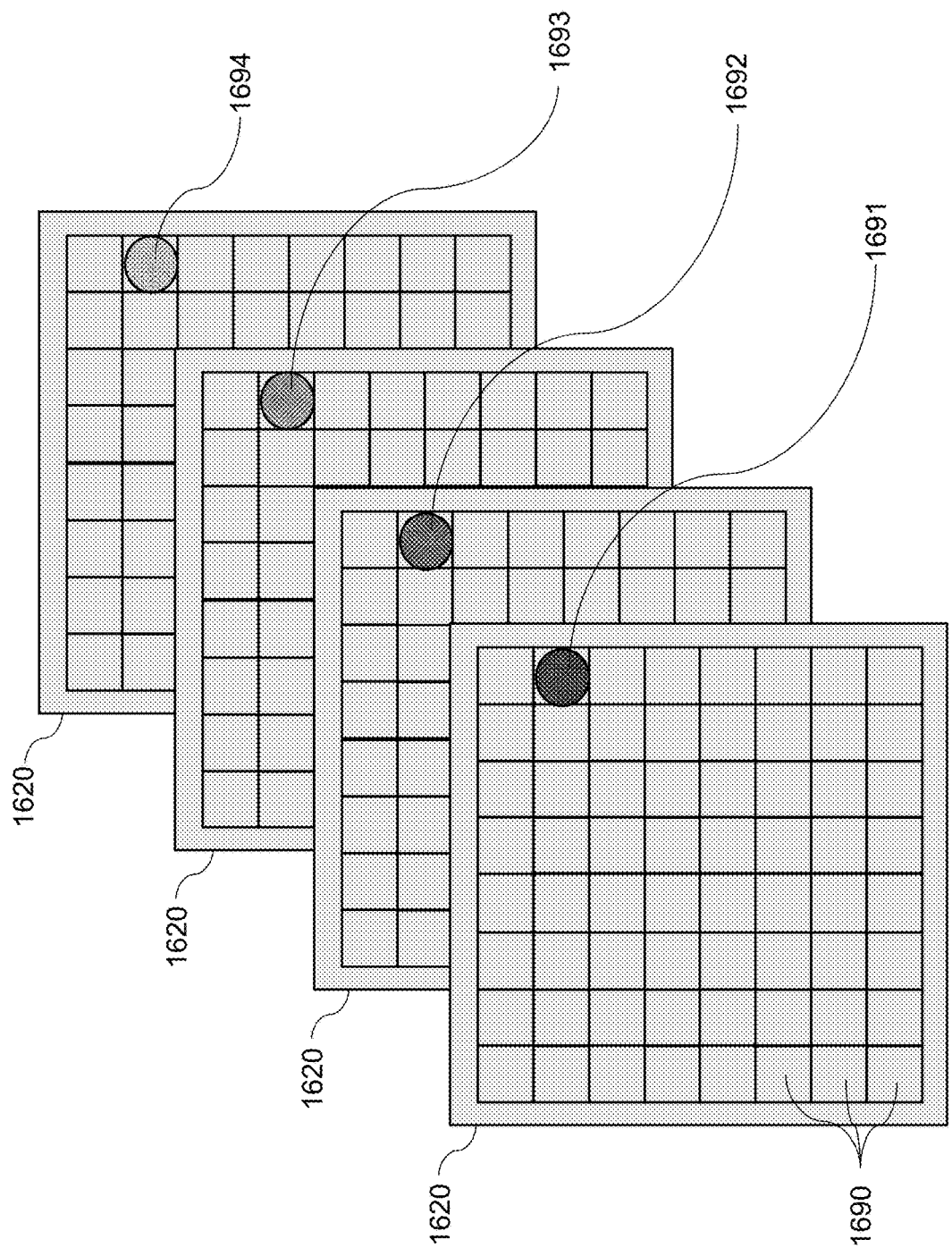
FIG. 16 illustrates grating stages of a projector, in accordance with a representative embodiment.

FIG. 16 illustrates grating stages 1620 of a projector, in accordance with a representative embodiment. The grating stages 1620 may be the same or similar to any as described herein, and more specifically, the grating stages 1620 may be the same or similar to those described with reference to FIG. 15, which may include properties of the grating stages described in Part I above. FIG. 16 clearly shows a plurality of pixels 1690 that may be included on each grating stage 1620.

As shown in FIG. 16, a pixel 1690 may turn to different "gray levels" through an attenuation process. In other words, application of a voltage to one or more pixels 1690 may control a gray level for these pixels 1690. By way of example, four grating stages 1620 are shown, and thus four gray levels are shown for a pixel 1690—a first gray level 1691, a second gray level 1692, a third gray level 1693, and a fourth gray level 1694.

In certain implementations, for a given pixel 1690 to be fully "on," no attenuation is applied to that pixel 1690 (e.g., through control voltage). Similarly, in certain implementations, for a pixel 1690 to be fully "off," the maximum voltage may be applied to that pixel 1690 in each grating stage 1620. Thus, a system may be designed in a binary manner—so that off equals no voltage, and on equals full voltage. In certain implementations, intermediate gray levels may be achieved by application of a different control voltage. As a voltage is applied, laser energy that remains on axis (the zero-order passing through the pixel 1690) may be reduced and distributed to the off-axis diffraction orders (the plus and minus first orders). By way of example, for a broadband application, multiple grating stages 1620 may be designed with different liquid crystal cell thicknesses as discussed in Part I above, and grating stages 1620 may be controlled equally during operation.

It will be understood that pixels 1690 included on two or more adjacent grating stages 1620 may be aligned on a one-to-one basis, a one-to-many basis, or a many-to-one basis. In this manner, light traveling through one pixel 1690 may then travel through another corresponding single pixel 1690, or through a plurality of corresponding pixels 1690. Also, or instead, light traveling through a plurality of pixels 1690 may then travel through a plurality of corresponding pixels 1690, or through a single corresponding pixel 1690.

A plurality of arrangements may be provided for the pixels 1690. For examples, the plurality of pixels 1690 may be arranged in an array. Other arrangements are also or instead possible. Also, a grating stage 1620 may include a variety of numbers of pixels 1690. In certain implementations, a number of pixels 1690 on each grating stage 1620 is the same. In other implementations, a number of pixels 1690 varies between different grating stages 1620 in the number of grating stages 1620. By way of example and not of limitation, a grating stage 1620 may include a 512 x 512 array of pixels 1690, but other numbers of pixels 1690 are of course possible.

Figure 17:
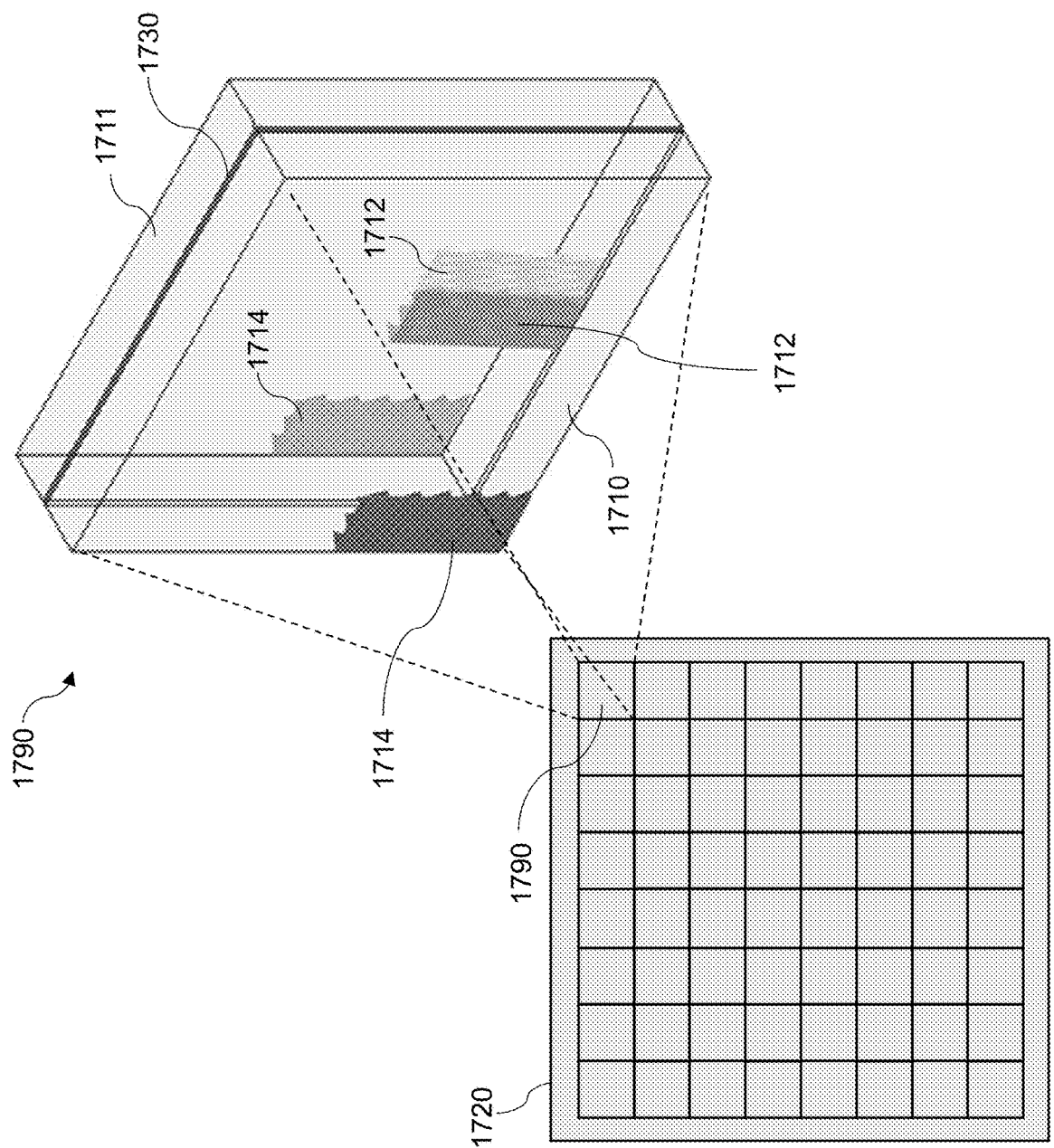
FIG. 17 illustrates a close-up view of a pixel of a grating stage, in accordance with a representative embodiment.

FIG. 17 illustrates a close-up view of a pixel 1790 of a grating stage 1720, in accordance with a representative embodiment. As shown in the figure, one or more of the pixels 1790 may include a liquid crystal layer 1730 disposed between two substrates (e.g., a first substrate 1710 and a second substrate 1711). One or more of the two substrates may be coated with a photo-alignment layer 1712 adjacent to the liquid crystal layer 1730, and one or more of the two substrates may be coated with transparent electrodes 1714. It will also be understood that one or more of the substrates may also or instead include photo-alignment properties (e.g., from a material property of the substrate), e.g., in addition to, or instead of, being coated with a photo-alignment layer 1712. Thus, in this manner, the photo-alignment properties of one or more of the first substrate 1710 and the second substrate 1711 may be provided by coating one or more of the first substrate 1710 and the second substrate 1711 with a photo-alignment layer 1712, or the photo-alignment properties may be inherent in the material or otherwise provided. Similarly, one or more of the first substrate 1710 and the second substrate 1711 may include transparent electrodes 1714, which may be coated on the substrates or provided by other means.

Figure 18:
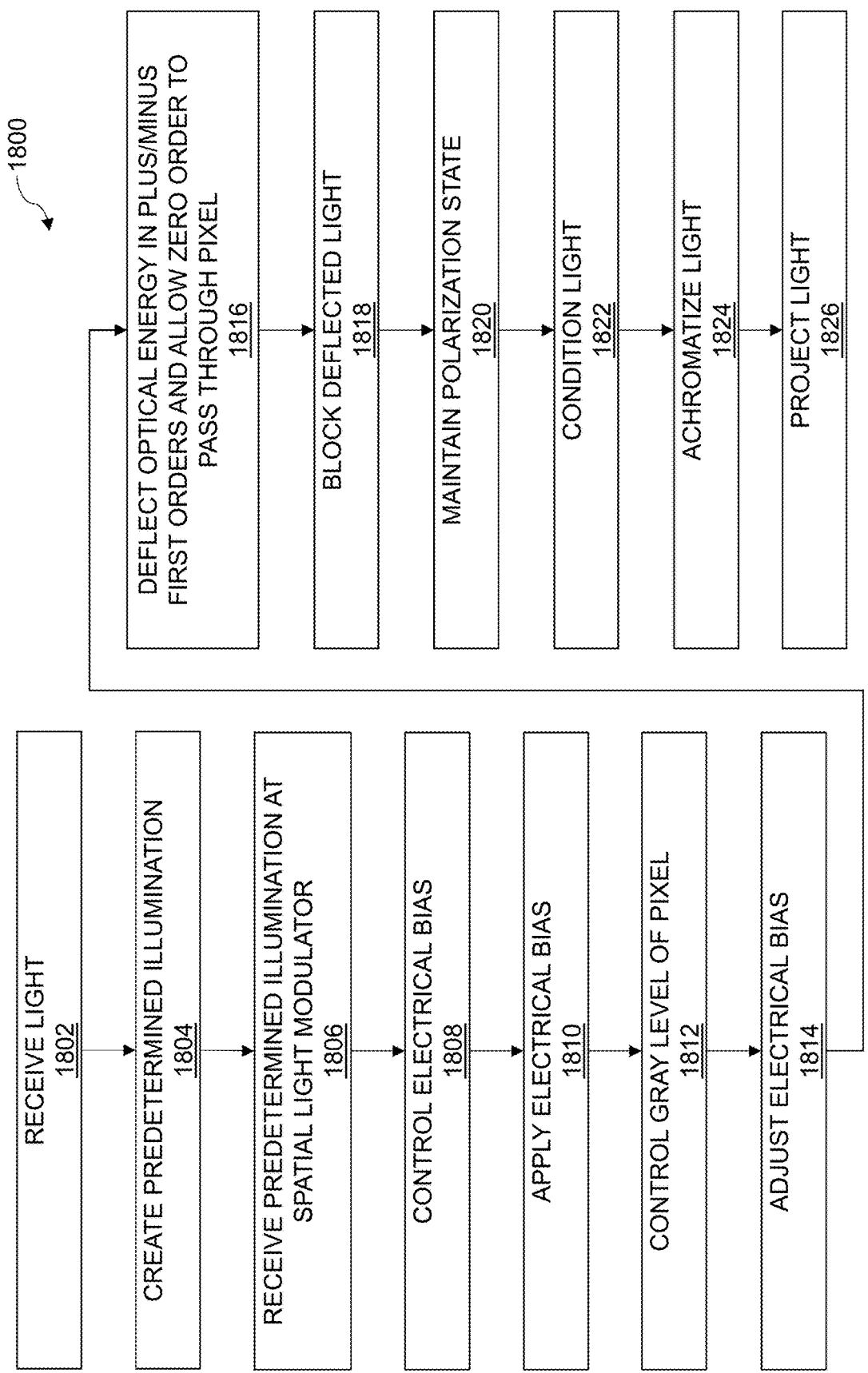
FIG. 18 is a flow chart of a method for projection, in accordance with a representative embodiment.

FIG. 18 is a flow chart of a method 1800 for projection, in accordance with a representative embodiment. The method 1800 may generally include the functionality of a projector or projection system as described herein, e.g., a design flow.

As shown in box 1802, the method 1800 may include receiving light from a light source.

As shown in box 1804, the method 1800 may include creating a predetermined illumination from the light.

As shown in box 1806, the method 1800 may include receiving the predetermined illumination at a spatial light modulator, where the spatial light modulator includes a number of grating stages. Each grating stage in the number of grating stages may include a plurality of pixels, where corresponding pixels in each of the number of grating stages are aligned with one another, and where each of the plurality of pixels includes a liquid crystal layer disposed between two substrates. One or more of the two substrates may be coated with a photo-alignment layer adjacent to the liquid crystal layer, and one or more of the two substrates may be coated with transparent electrodes.

As shown in box 1808, the method 1800 may include controlling an electrical bias to be applied to one or more of the pixels.

As shown in box 1810, the method 1800 may include applying the electrical bias to one or more of the pixels.

As shown in box 1812, the method 1800 may include controlling a gray level for one or more of the pixels, e.g., by adjusting the electrical bias applied thereto. Thus, as shown in box 1814, the method 1800 may include adjusting the electrical bias applied to one or more of the pixels.

As shown in box 1816, the method 1800 may include deflecting, in response to an electrical bias applied to one or more pixels, optical energy from light in plus and minus first orders, and allowing a zero order of the light to pass through one or more pixels. Similarly, as shown in box 1818, the method 1800 may include blocking light in the plus and minus first orders that is deflected by one or more of the pixels.

As shown in box 1820, the method 1800 may include maintaining a polarization state of the light from an input of the light entering one or more of the pixels through an output of the light exiting one or more of the pixels.

As shown in box 1822, the method 1800 may include conditioning light that is output from the number of grating stages for projection. Conditioning the light may include the use of an optical element, or a projection optic element or system.

As shown in box 1824, the method 1800 may include achromatizing light through the number of grating stages by selecting a thickness of each of the number of grating stages (i.e., a thickness of the liquid crystal layer of a pixel).

As shown in box 1826, the method 1800 may include projecting light.

Figure 19:
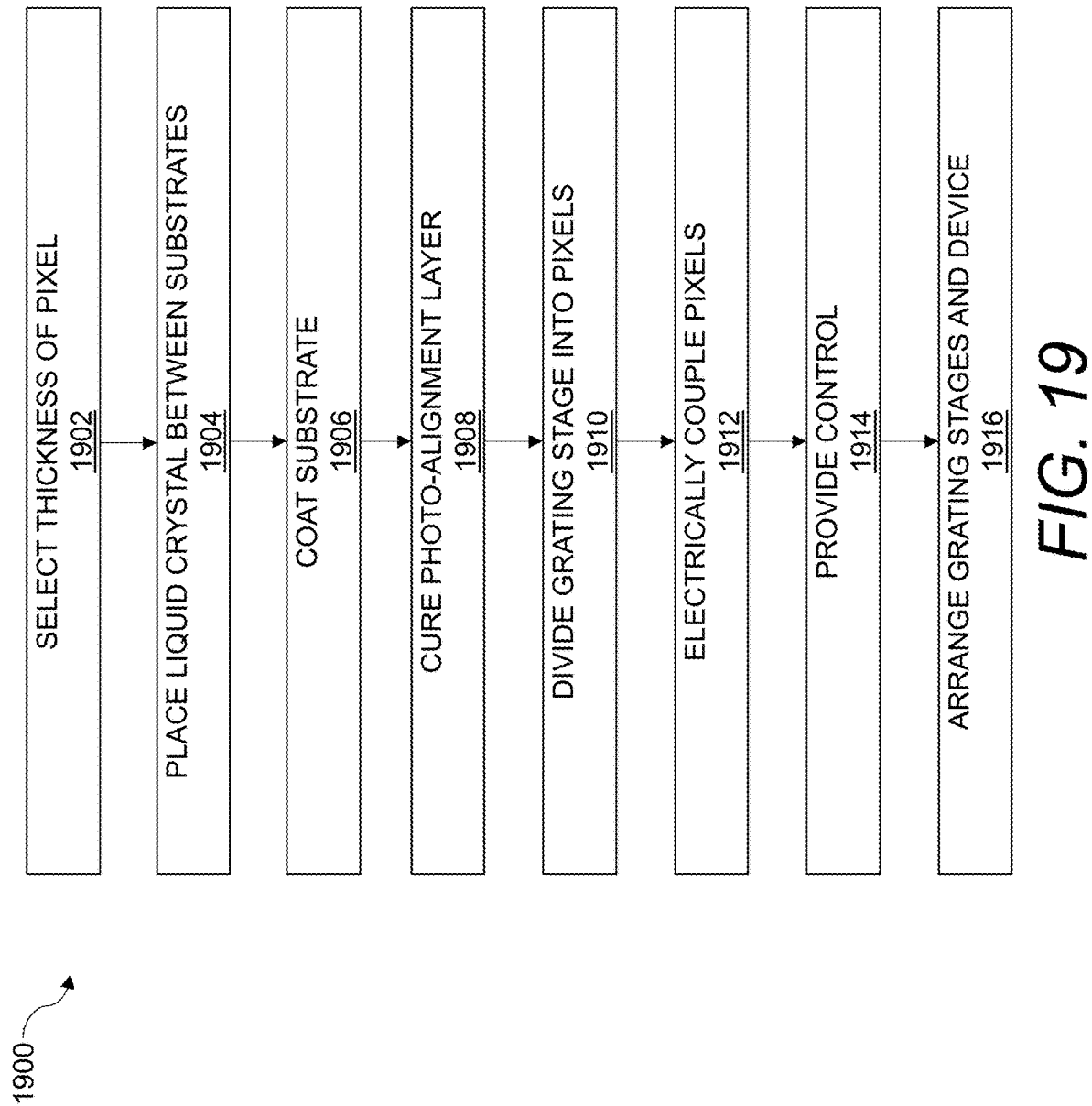
FIG. 19 is a flow chart of a method of making a projector, in accordance with a representative embodiment.

FIG. 19 is a flow chart of a method of making a projector, in accordance with a representative embodiment. The method 1900 may generally include making a projector or projection system as described herein.

As shown in box 1902, the method 1900 may include selecting a thickness of a pixel to be included in a grating stage of a spatial light modulator of a projector.

As shown in box 1904, the method 1900 may include placing a liquid crystal layer between two substrates to create the grating stage included in a plurality of grating stages of the spatial light modulator.

As shown in box 1906, the method 1900 may include coating one or more of the two substrates with a photo-alignment layer adjacent to the liquid crystal layer, and coating one or more of the two substrates with transparent electrodes. Also, as shown in box 1908, the method 1900 may include curing the photo-alignment layer.

As shown in box 1910, the method 1900 may include dividing the grating stage into a plurality of pixels.

As shown in box 1912, the method 1900 may include electrically coupling one or more pixels of the plurality of pixels to be independently switchable by applying a voltage thereto. A grating period of one or more pixels may be selected such that, when the voltage is applied to a pixel and light is passed therethrough, optical energy from light in plus and minus first orders is deflected toward sides of the pixel and optical energy from a zero order of the light is allowed to pass through the pixel. A polarization state of the light may be maintained from an input of the light entering the pixel through an output of the light exiting the pixel.

As shown in box 1914, the method 1900 may include providing a control for applying the voltage to one or more pixels.

As shown in box 1916, the method 1900 may include arranging the plurality of grating stages to form the spatial light modulator, and arranging the spatial light modulator downstream of a beam homogenizer in a projector.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

What is claimed is:

1. A method comprising:
   creating a grating stage by:
   preparing a first side of at least one of two substrates to include photo-alignment properties;
   placing a liquid crystal layer between the two substrates adjacent to the first side; and
   coupling a transparent electrode to a second side of the at least one of the two substrates, wherein the second side opposes the first side;
   arranging a plurality of grating stages in a spatial light modulator;
   selectively biasing a grating stage of the plurality with a grating period such that optical energy from traversing light in plus and minus first orders is deflected and optical energy from traversing light in a zero order is allowed to pass through the grating stage with a polarization state of the traversing light maintained.

2. A method comprising:
   receiving light from a light source;
   creating a predetermined illumination from the light;
   receiving the predetermined illumination at a spatial light modulator comprising a number of grating stages, each grating stage in the number of grating stages comprising a plurality of pixels where corresponding pixels in each of the number of grating stages are aligned with one another, and where each of the plurality of pixels comprises a liquid crystal layer disposed between two substrates, where one or more of the two substrates is coated with a photo-alignment layer adjacent to the liquid crystal layer and coated with transparent electrodes;
   applying an electrical vias to at least one grating stage in the number of grating stages, whereby said applying deflects optical energy from the predetermined illumination that is in plus and minus first orders while optical energy from predetermined illumination that is in a zero order passes through the at least one grating.

3. The method of claim 2, further comprising maintaining a polarization state of the light from an input of the light entering the pixel through an output of the light exiting the pixel.

4. The method of claim 2, further comprising conditioning light that is output from the number of grating stages for projection.

5. The method of claim 2, further comprising achromatizing light through the number of grating stages by selecting a thickness of each of the number of grating stages.

6. The method of claim 5, further comprising controlling a gray level for the pixel.

7. The method of claim 2, further comprising adjusting the electrical bias applied to the pixel.

8. The method of claim 1, wherein creating the grating stage further comprises:
   dividing the liquid crystal into a plurality of pixels.

9. The method of claim 8, wherein the plurality of pixels are aligned.

10. The method of claim 1, wherein the deflected optical energy is directed to a wall or a beam stop of the spatial light modulator.

11. The method of claim 10, wherein the wall or the beam stop includes a high-absorption coating.

12. The method of claim 1, wherein the photo-alignment properties of the first side of the at least one of the two substrates includes an applied photo-alignment coating.

13. The method of claim 2, wherein the deflected optical energy is deflected to a wall or a beam stop of the spatial light modulator.

14. The method of claim 8, wherein the wall or the beam stop includes a high-absorption coating.

\* \* \* \* \*